(12) United States Patent
Springer

(10) Patent No.: US 12,284,231 B2
(45) Date of Patent: Apr. 22, 2025

(54) UNIFIED VIDEO STREAM IN VIDEO CONFERENCING

(71) Applicant: Zoom Communications, Inc., San Jose, CA (US)

(72) Inventor: Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 207 days.

(21) Appl. No.: 17/973,157

(22) Filed: Oct. 25, 2022

(65) Prior Publication Data

US 2024/0137398 A1    Apr. 25, 2024
US 2024/0236161 A9    Jul. 11, 2024

(51) Int. Cl.
*H04L 65/403*    (2022.01)
*H04N 5/265*    (2006.01)
*H04N 5/272*    (2006.01)

(52) U.S. Cl.
CPC ........... *H04L 65/403* (2013.01); *H04N 5/265* (2013.01); *H04N 5/272* (2013.01)

(58) Field of Classification Search
CPC ....... H04L 65/403; H04N 5/265; H04N 5/272
See application file for complete search history.

(56) References Cited

U.S. PATENT DOCUMENTS

| | | | |
|---|---|---|---|
| 8,698,874 B2 * | 4/2014 | Watson | H04N 7/15 |
| | | | 709/201 |
| 9,065,974 B2 | 6/2015 | Halavy | |
| 9,652,828 B1 * | 5/2017 | Sabripour | H04N 7/181 |
| 2017/0126968 A1 * | 5/2017 | Somanath | H04N 13/15 |
| 2021/0176444 A1 * | 6/2021 | Liu | H04N 7/157 |
| 2023/0139723 A1 * | 5/2023 | Thiel | G06T 13/40 |
| | | | 715/757 |

FOREIGN PATENT DOCUMENTS

| | | |
|---|---|---|
| EP | 3070876 A1 | 9/2016 |
| EP | 3398328 B1 | 8/2021 |

OTHER PUBLICATIONS

International Search Report and Written Opinion mailed on Dec. 5, 2023 in corresponding PCT Application No. PCT/US2023/032067.
Wondershare, Filmora Video Editor, https://filmora.wondershare.com/video-editing-tips/video-stitching-softwares.html, Liza Brown, Aug. 30, 2022, 9 pages.

(Continued)

*Primary Examiner* — Amal S Zenati
(74) *Attorney, Agent, or Firm* — Young Basile Hanlon & MacFarlane, P.C.

(57) ABSTRACT

Respective video streams of participants of a video conference are received. A first video stream of the respective video streams is determined to be unstitchable into a unified stream of the video conference. A request for a stitching image is transmitted to a participant of the participants corresponding to the first video stream. The stitching image is received from the participant. The first video stream is stitched into the unified stream by stitching the first video stream with at least one other video stream of the respective video streams. The unified stream is transmitted for display at a device connected to the video conference.

20 Claims, 15 Drawing Sheets

(56) References Cited

OTHER PUBLICATIONS

YouTube, VideoStitch real-time 4K video stitching software, https://www.youtube.com/watch?v=t6mvlJShF4s, Charbax, Jul. 29, 2016, 4 pages.

PYimagesearch, Real-time panorama and image stitching with OpenCV, https://pyimagesearch.com/2016/01/25/real-time-panorama-and-image-stitching-with-opencv/, Adrian Rosebrock, Jan. 25, 2016, 82 pages.

Journal of Physics: Conference Series, A fast and robust real-time surveillance video stitching method, chrome-extension://efaidnbmnnnibpcajpcglclefindmkaj/https://iopscience.iop.org/article/10.1088/1742-6596/1651/1/012170/pdf, tao yang et al, 2020, 8 pages.

YouTube, Computing Homography, Image Stitching, https://www.youtube.com/watch?v=l_qjO4cM74o, First Principles of Computer Vision, Mar. 2, 2021, 4 pages.

\* cited by examiner

UNIFIED VIDEO STREAM IN VIDEO CONFERENCING

FIELD

This disclosure relates generally to conference management and, more specifically, to generating a unified video stream for a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
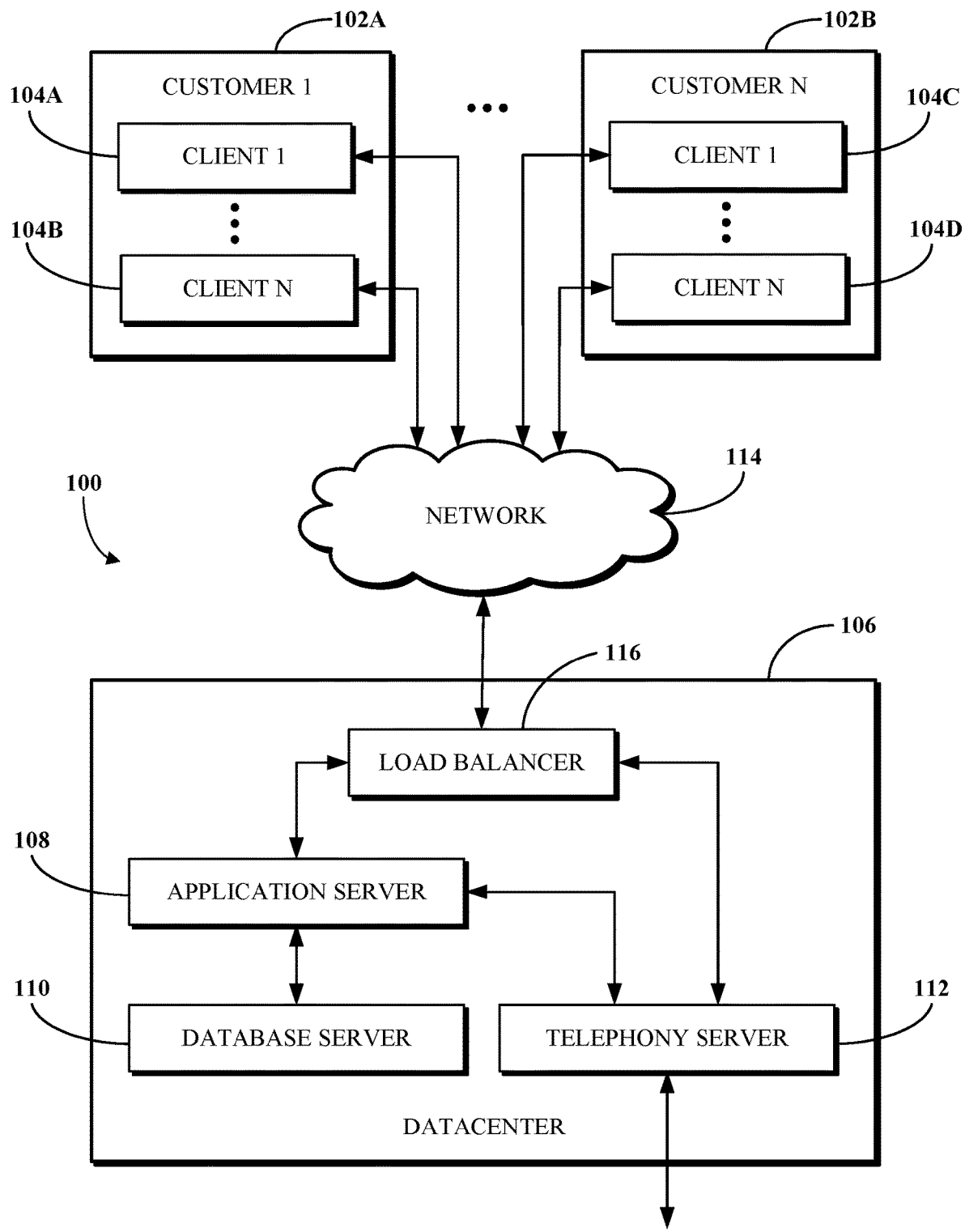
FIG. 1 is a block diagram of an example of an electronic computing and communications system.

A conferencing software may receive video streams from multiple devices joined to a video conference. Each video stream may be displayed in its own tile. That is, the conferencing software may display or cause to be displayed (such as on a display of a device of a conference participant) the video streams of the various conference participants connected to the video conference in respective tiles within a graphical user interface of the conferencing software. A tile, as used herein, refers to a user interface component (e.g., a panel, a window, or a box) that can be used to display one video stream depicting one or more conference participants.

For at least some video conferences, it may be desirable to consolidate (e.g., combine) video streams from multiple devices connected to a same video conference and from a same location (e.g., a conference room, a design lab, or an immersive studio) into one unified video stream (or, simply, a "unified stream") that can be displayed in one tile. By presenting a unified stream, the conferencing software would present a more engaging experience for the conference participants. As compared to separate tiles, because the unified stream depicts video content collectively beyond that of the individual video streams stitched together to form it, the unified stream would enable a better contextual or situational awareness of the physical environment captured in the unified stream and of the conference participants shown in the unified stream. However, the conferencing software may lack the capabilities to implement such a unified stream.

To solve problems such as these (i.e., to provide unified streams), a conferencing software according to implementations of this disclosure may identify features (e.g., objects or persons) in the video streams and may use these features to stitch the video streams together into a unified stream. To illustrate, the conferencing software may receive three video streams. A painting, a whiteboard, and a portion of the painting may be identified in the first video stream, the second video stream, and the third video stream, respectively. The conferencing software can determine to stitch and accordingly stitch the first and the third together into a unified stream based on both depicting the same object (i.e., the painting) or portions thereof. The unified stream can be presented in one tile and the second video stream can be presented in a second, separate tile. In some cases, the conferencing software may receive video streams such that by stitching at least some of the video streams a complete (e.g., panoramic or 360) view of the physical environment can be formed.

In some situations, the conferencing software may not be able to stitch one of the video stream into the unified stream. To illustrate, the video stream from a laptop of a conference participant may not be stitchable with any of the other received video streams because, for example, the conferencing software may not identify features in the video stream that can be used to stitch the video stream into the unified stream. That is, the conferencing software may not in such a case identify features in the video stream that can be used to stitch the video stream with one of the other video streams included in the unified stream. A video stream that cannot be stitched into the unified stream is referred to herein as an unstitchable stream. To enhance the situational and contextual awareness and to present a more complete view of the environment to the video conference participants, it would be desirable to include the unstitchable stream into the unified stream.

Implementations of this disclosure address problems such as these by obtaining at least one image (i.e., a stitching image) that includes overlap areas (e.g., common features, such as one or more objects and/or people) with the unstitchable stream and at least one other of the video streams included in the unified stream. In an example, the conferencing software can transmit a request for a stitching image to the conference participant corresponding to the unstitchable stream (i.e., the conference participant from whose device the unstitchable stream is received at the conferencing software). The conference participant may use a second device (e.g., a device other than the device that the conference participant used to join the conference) to obtain and transmit the stitching image to the conferencing software. To illustrate, the conference participant may join the conference using a laptop device, from which the unstitchable stream is received, and may use a portable device (e.g., a mobile phone or a tablet) to obtain the stitching image. The conferencing software can use the stitching image as the bridge (e.g., glue) between the unstitchable stream and the unified stream. As further described herein, the stitching image may be obtained from a device that is connected to the video conference or from a device that is not connected to the video conference.

To describe some implementations in greater detail, reference is first made to examples of hardware and software structures used to implement a generating a unified video stream for a video conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a unified communications as a service (UCaaS) platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
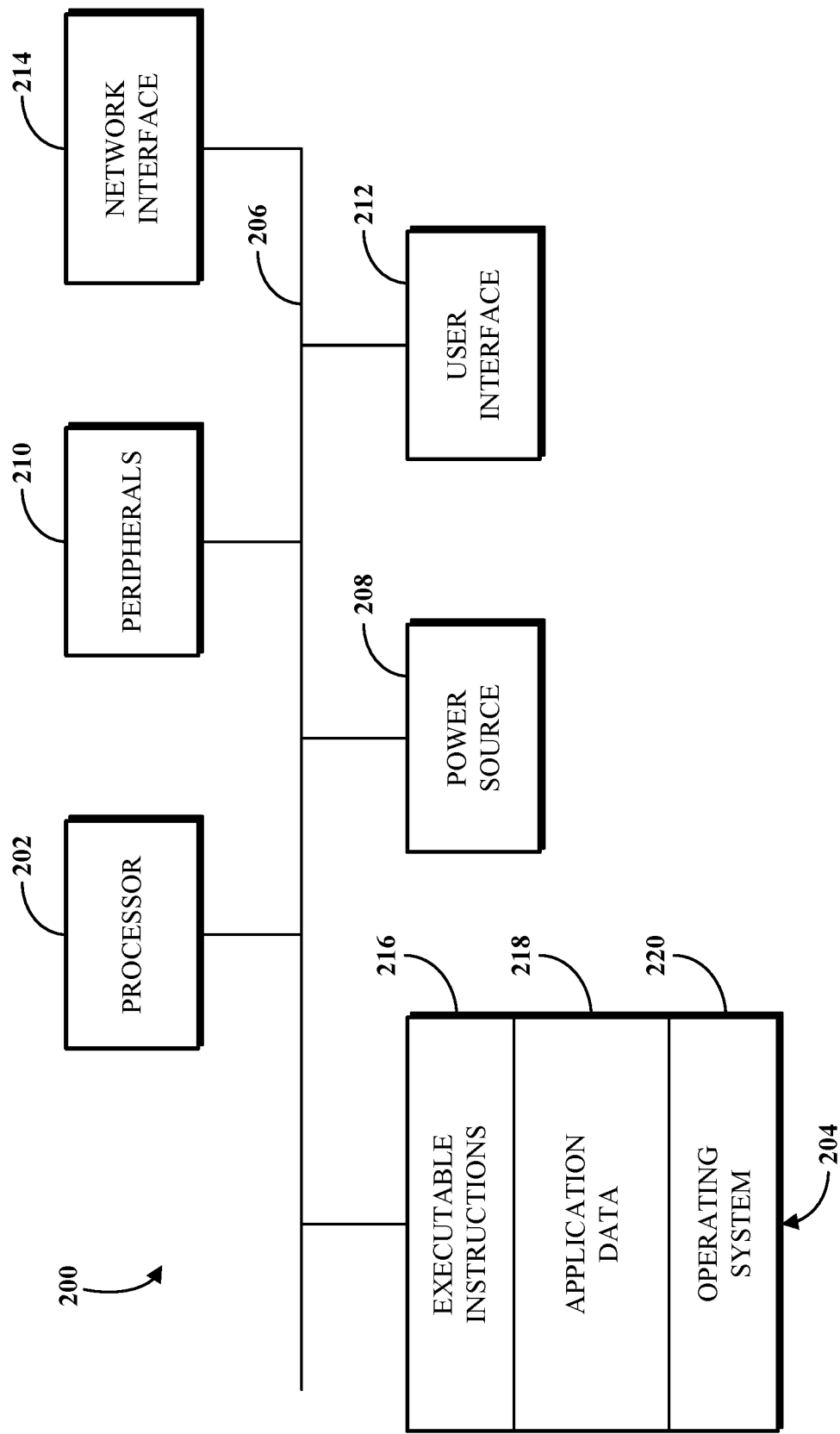
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
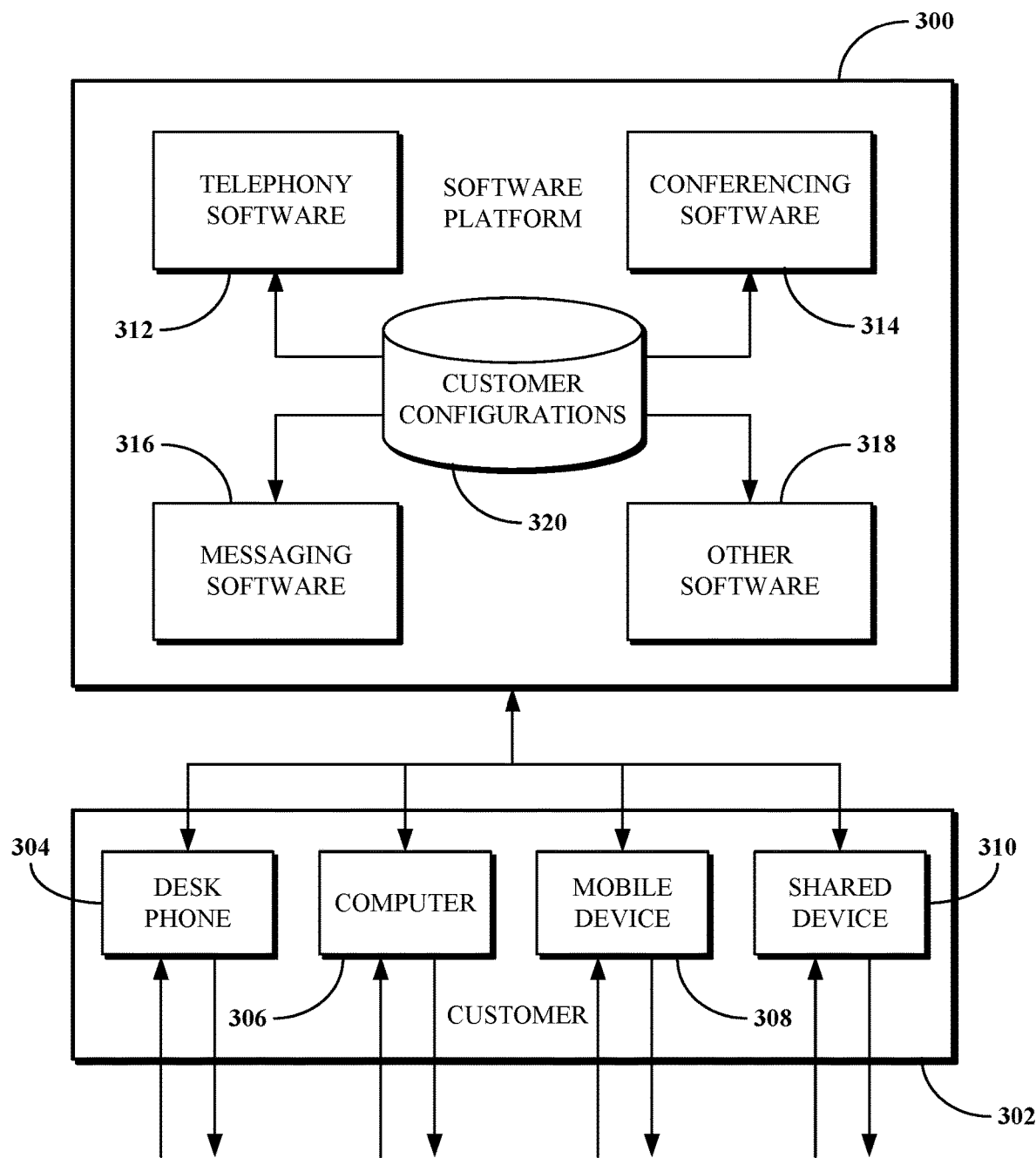
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a stream-unification software for generating a unified stream for a video conference. In some such cases, the conferencing software 314 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
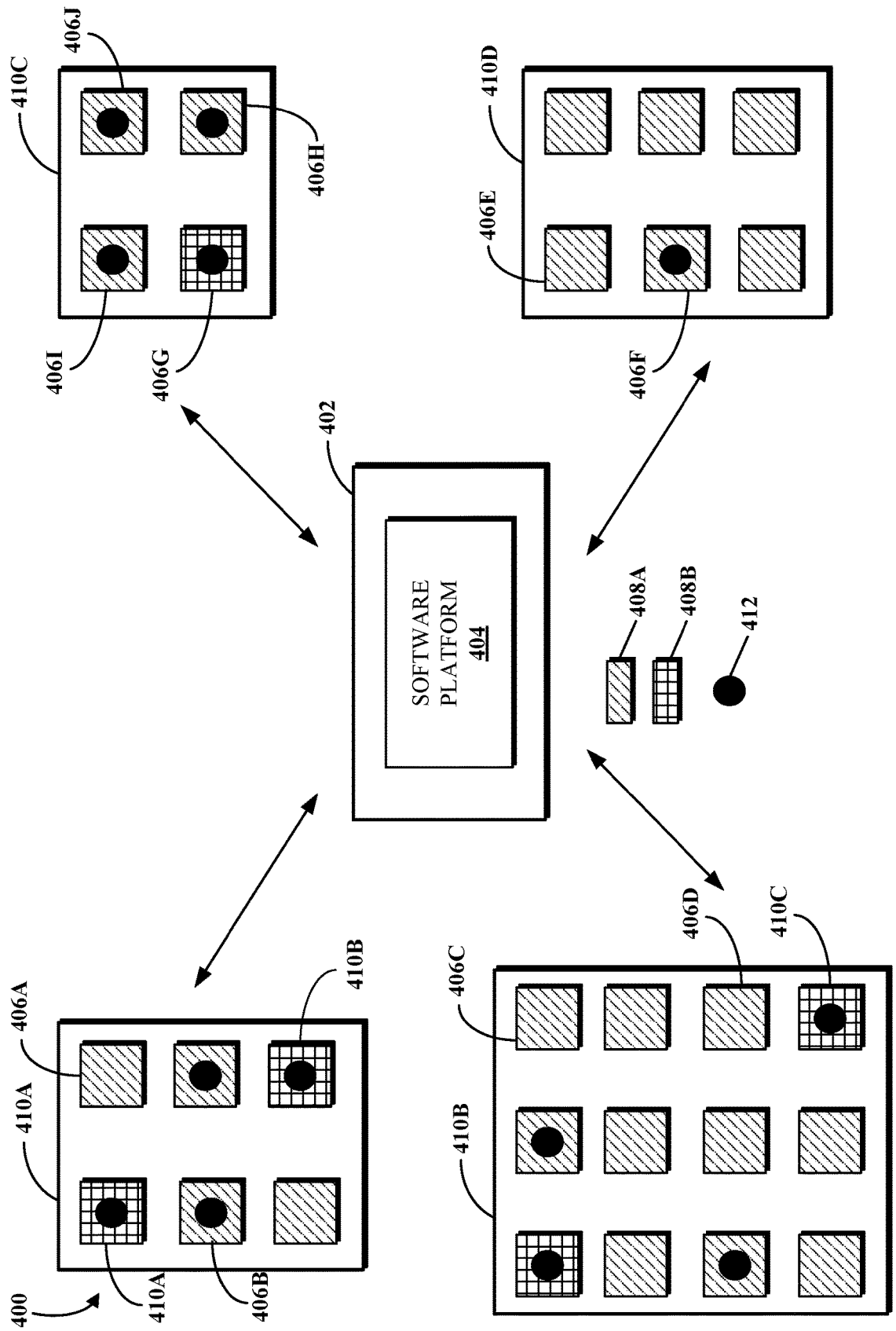
FIG. 4 is an example of an environment where generating a unified video stream for a video conference can be used.

FIG. 4 is an example of an environment 400 where generating a unified video stream for a video conference can be used. The environment 400 includes a server 402 that implements a software platform 404, which may be, for example, the software platform 300 of FIG. 300. As such, the server 402 includes or implements conferencing services that may be provided or enabled by a conferencing software, such as the conferencing software 314 of FIG. 3.

FIG. 4 illustrates that conference participants are joined to a video conference from four different locations (i.e., locations 410A-410D). Several devices are joined to the video conference from each location. Each filled square box at a location depicts a device that is joined to the video conference. Some of the devices may be devices of conference participants and some of the devices may be fixed devices.

Boxes filled with a pattern 408A illustrate devices of conference participants. Examples of such conference participant devices include devices 406A-406J. Boxes filled with a pattern 408B illustrate fixed devices. Examples of such fixed devices include devices 410A-410C. While a certain number of devices and locations are shown in FIG. 4, the disclosure is not so limited and more or fewer devices and/or locations can be connected to an ongoing video conference. At least some of the devices joined to the video conference may have a configuration as described with respect to FIG. 6, below. As such, a device may include a stitching-helper software, such as a stitching-helper software (SHS) 612 of FIG. 6.

A fixed device can be or include a capture device (e.g., a camera) placed in or assigned to a physical environment (such as a conference room) for the purpose of streaming video of the physical environment (or a portion thereof) during a video conference. Fixed devices may also be joined to the video conference and may be considered to be devices of conference participants. However, for purposes of this disclosure fixed devices may be distinguished from devices of (human) conference participants.

Devices that include a circle (such as a circle 412) are devices that are configured to stream respective video streams to the software platform 404 during the video conference. For example, in the location 410D, the conference participant of device 406F is illustrated as having turned on (e.g., enabled) their camera, whereas the conference participant of device 406E has not. The software platform 404 may in turn transmit at least some of these video streams to the conference participants. The software platform 404 may obtain respective unified streams corresponding to the locations 410A-410D. In some situations, and as further described herein, the software platform 404 may not be able to combine all of the video streams received from a location into one unified stream. To illustrate, the software platform 404 may be able to combine (e.g., stitch) the video streams received from the devices 406G and 406H into a unified stream, but may not be able to add the video stream received from the device 406I into the unified stream. As such, the video stream received from the device 406I is an unstitchable stream.

Figure 5:
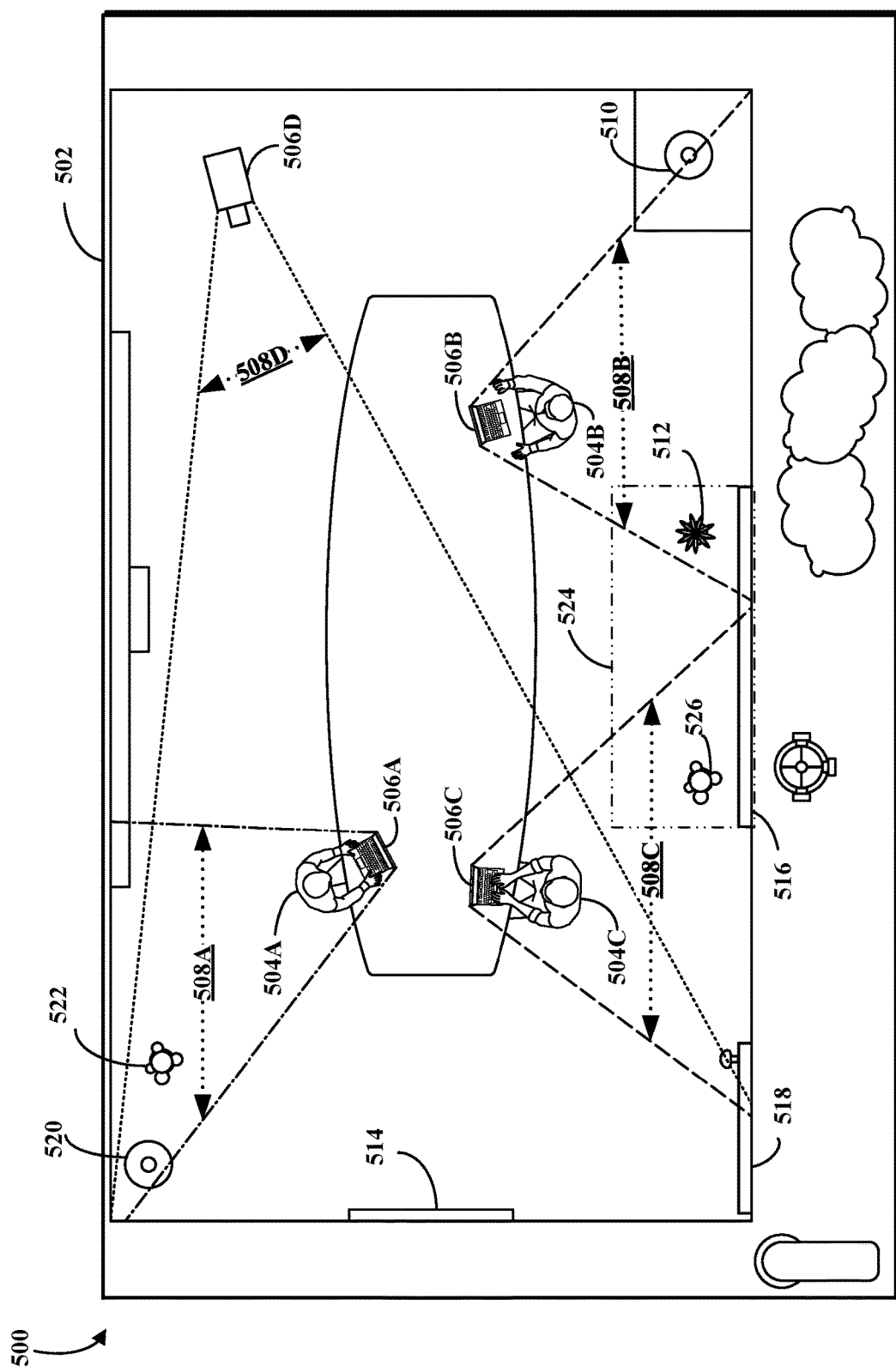
FIG. 5 is another example of an environment where generating a unified video stream for a video conference can be used.

FIG. 5 is another example of an environment 500 where generating a unified video stream for a video conference can be used. The environment 500 illustrates a conference room 502. The conference room 502 can be the location 410C of FIG. 4. The conference room 502 includes three conference participants 504A-504C each joined to a video conference (not shown) via respective devices 506A-506C. While not specifically shown, each of the devices 506A-506C includes a capture device (such as a camera that may be capable of image and video capture).

A conferencing application executing at a device may receive a video stream from the capture device and transmits the video stream to a software platform, such as the software platform 404 of FIG. 4. A fixed device 506D is also joined to the video conference. A capture device, when enabled (e.g., turned on) during a video conference, can capture that portion of the conference room 502 that is within a field of view (FOV) of the capture device. The devices 506A-506D are shown as having FOVs 508A-508D, respectively. Similarly, the fixed device 506D may include, or may work in conjunction with, a conferencing application that receives a video stream from the fixed device 506D for transmission to the conferencing software.

Figure 6:
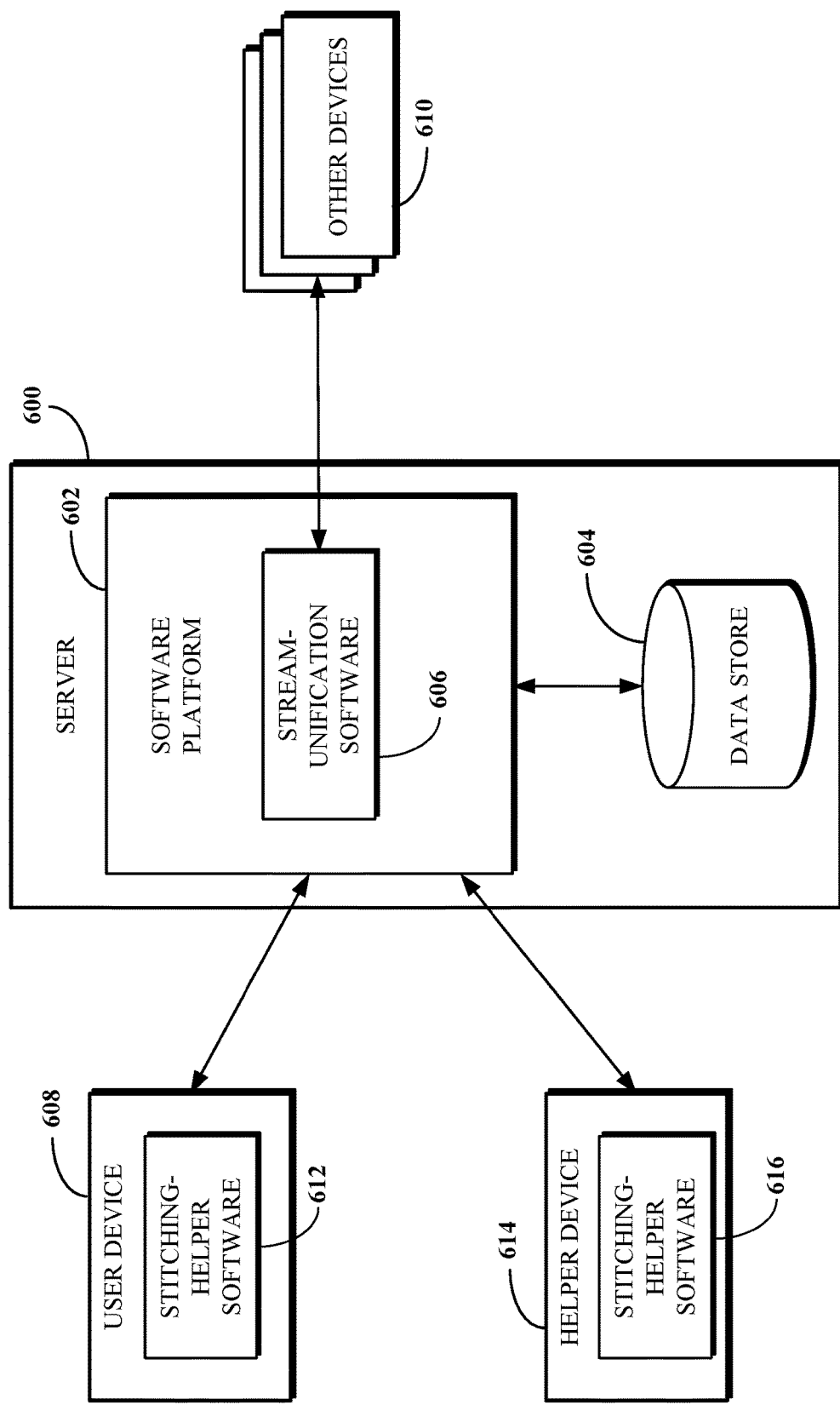
FIG. 6 is a block diagram of an example of a server for generating a unified video stream for a video conference.

FIG. 6 is a block diagram of an example of a server 600 for generating a unified video stream for a video conference.

The server 600 enables users to participate in (e.g., virtually join) video conferences. As shown, the server 600 implements or includes a software platform 602 and a data store 604. The server 600 can be one or more servers implemented by or included in a datacenter, such as the datacenter 106 of FIG. 1. The software platform 602 provides conferencing services (e.g., capabilities or functionality) via a conferencing software (not shown). The software platform 602 can be or can be part of the software platform 300 of FIG. 3. The conferencing software can be variously implemented in connection with the software platform 602. In some implementations, the conferencing software can be included in or can work in conjunction with one or more of the telephony software 312, the messaging software 316, or the other software 318 of FIG. 3. For example, the conferencing software may be or may be integrated within the conferencing software 314.

FIG. 6 illustrates that a user device 608 and other devices 610 are joined to a video conference enabled by the software platform 602. At least some of the joined devices may be transmitting respective video streams to the software platform 602. To illustrate, the user device 608 can be one of the devices 506A-506C and the other devices 610 can be the other of the devices 506A-506C and the fixed device 506D. The video stream from the user device 608 is an unstitchable stream. As can be appreciated, many user devices may simultaneously connect to a conference. Similarly, a software platform 602 implemented using the server 600 can enable many conferences to be concurrently active.

The data store 604 can store data related to users and conferences, as further described herein. The data store 604 can be included in or implemented by a database server, such as the database server 110 of FIG. 1. The data store 604 can include data related to scheduled or ongoing conferences and data related to users of the software platform 602. The data store 604 can include one or more directories of users. Information associated with users in the data store 604 can include an office address, a telephone number, a mobile telephone number, an email address, project or group memberships, and the like.

The software platform 602 includes a stream-unification software (SUS) 606. The SUS 606 combines at least some of the video streams received from devices joined to a video conference into one unified stream. The video streams may be received from devices that are located within a same physical environment. The SUS 606 may identify features (e.g., objects or portions thereof) common to two video streams and use these features for stitching the two video streams together.

In some situations, the SUS 606 may not be able to combine one of the received video streams into the unified stream. That is, the SUS 606 may receive N video streams and may be able to combine M (where M<N) of the video streams into one unified stream, but may not be able to stitch the remaining N-M streams into the unified stream. In an example, the SUS 606 may not be able to stitch a first stream into the unified stream because the SUS 606 is not able to identify common features between the first video stream and at least one other stream that can be used to stitch the first video stream with the least one other video stream.

In such situations, the SUS 606 may obtain a stitching (e.g., bridging) image that, on the one hand, includes a common feature with the first video stream (which is unstitchable) and, on the other hand, includes common features with at least one of the other video stream (either stitchable or unstitchable). As such, the SUS 606 can stitch the stitching image into the unified stream and thereby stitch the unstitchable stream with both the stitching image and the at least one other video stream. For purposes of this description, it is assumed that the unstitchable stream is the video stream received from the user device 608. The SUS 606 may obtain the stitching image using or via stitching helper software (SHS) 612 executing on or available at the user device 608, as further described herein. The SHS 612, which is further described below with respect to FIG. 9, includes functionality that facilitates obtaining the stitching image.

In an example, the SUS 606 may obtain the stitching image from or via a helper device 614 that may include a stitching helper software (SHS) 616. The device 614 may not be connected to the video conference. The SHS 616 may be similar or different (in terms of functionality and available tools) from the SHS 612. In an example, the helper device 614 can be a device of the conference participant associated with the unstitchable stream. To illustrate, the helper device 614 may be a personal device (e.g., a mobile phone or a tablet) of the conference participant associated with the user device 608. In another example, the helper device 614 can be a device associated with another conference participant. In yet another example, the user device 608 can be used as a helper device.

Figure 7:
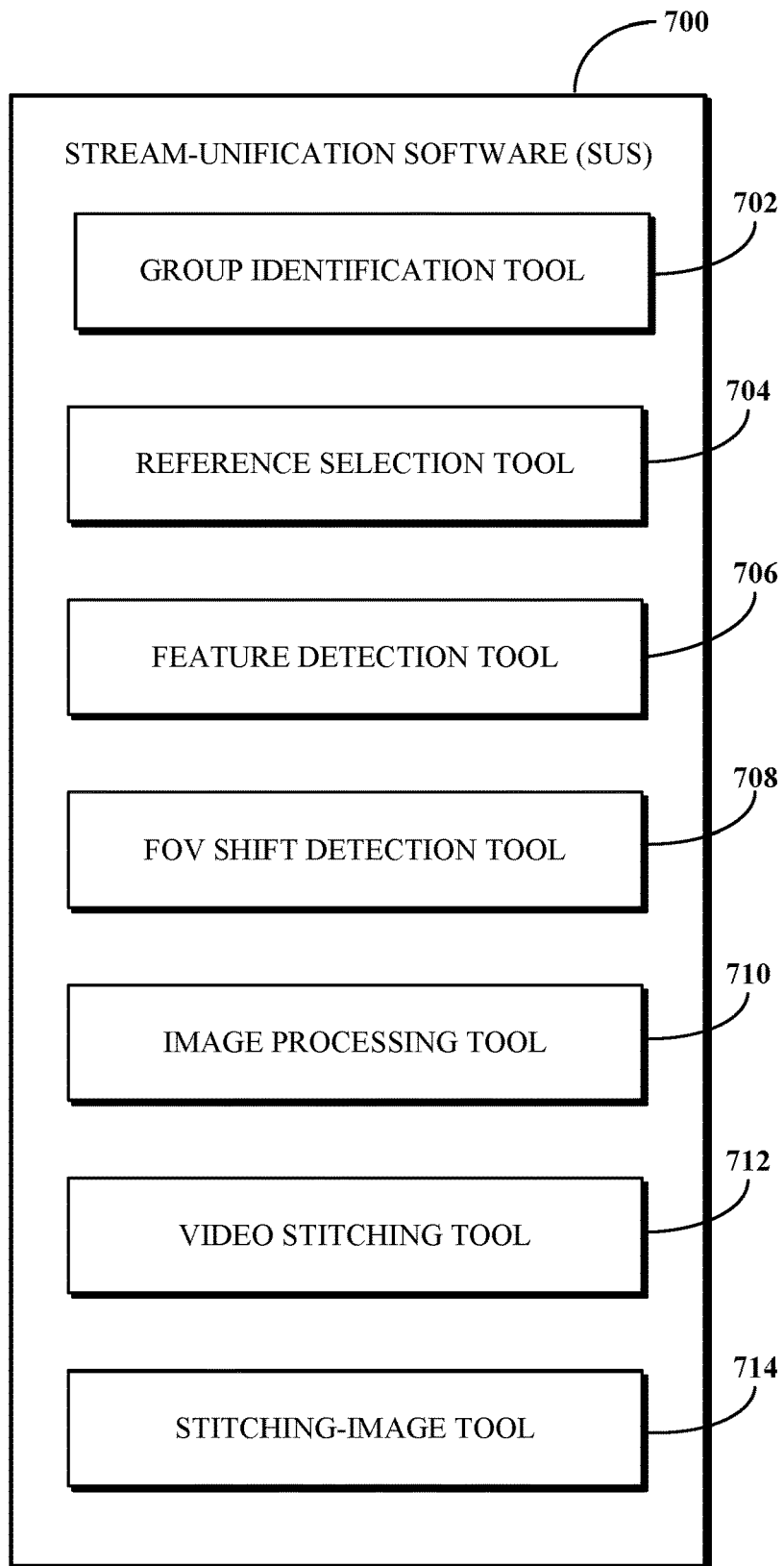
FIG. 7 is a block diagram of example functionality of a stream-unification software.

FIG. 7 is a block diagram of example functionality of a stream-unification software (SUS) 700, which may be, for example, the stream-unification software (SUS) 606 of FIG. 6. The SUS 700 includes tools, such as programs, subprograms, functions, routines, subroutines, operations, executable instructions, and/or the like for, inter alia and as further described below, generating a unified video stream for a video conference.

At least some of the tools of the SUS 700 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the SUS 700 includes a group identification tool 702, a reference selection tool 704, a feature detection tool 706, a FOV shift detection tool 708, an image processing tool 710, a video stitching tool 712, and a stitching-image detection tool 714. In some implementations, the SUS 700 can include more or fewer tools. In some implementations, some of the tools may be combined, some of the tools may be split into more tools, or a combination thereof.

The group identification tool 702 identifies groups of video streams. Video streams received from devices that are in the same physical location may be grouped into one group. Video streams can be grouped into groups so that the SUS 700 can identify which video streams are to be stitched (or attempted to be stitched) into a unified stream. To illustrate, video streams received from devices at the location 410A of FIG. 4 may be grouped into a first group, video streams received from devices at the location 410B of FIG. 4 may be grouped into a second group, and so on. Many techniques or combination of techniques for identifying groups of devices are possible.

In an example, the group identification tool 702 can receive data from devices joined to a video conference that can be used to identify the groups. The data may, for example, be or include location information received from the devices. The location information can, for example, be or include Global Positioning System (GPS) information. In another example, the group identification tool 702 may prompt conference participants (such as upon joining the video conference) to provide location information. To illustrate, a conference participant may respond with "Yosemite Conference Room," or the like.

In another example, the group identification tool 702 may receive, from at least some devices joined to the video conference, respective lists of devices that the devices are locally able to communicate with, such as described below with respect to FIG. 9. The group identification tool 702 uses these communication data to identify the groups of devices. To illustrate, four devices (A, B, C, and D) may be joined to a video conference. The group identification tool 702 may receive from device A communication data indicating that device A can locally communicate with devices B and C; and may receive from device D communication data indicating that device D can locally communicate with devices A and C. Based on these communication data, the devices A, B, C, and D can be grouped into one group.

In an example, the group identification tool 702 may receive an opt-out request from a device. For example, the conference participant associated with the device may cause the opt-out request to be transmitted to the SUS 700. In response to the out-opt request, the SUS 700 does not combine (or attempt to combine) the video stream received from the device into the unified stream. The conference participant may transmit the opt-out request at any time that the conference participant is joined to the video conference. In another example, the conference participant may set a preference (which may be saved to the data store 604 of FIG. 6) indicating that the SUS 700 is not to combine video streams associated with the conference participant into unified streams.

The reference selection tool 704 may identify one or more of the video streams in a group as reference streams. A reference stream can be used to reduce (computational) complexity. A reference stream can be a starting stream for obtaining a unified stream. As such, the reference stream can be used as an initial (e.g., first) stream of the unified stream. That is, a reference stream may be considered to be a first video stream added to the unified stream. In an example, fixed devices may be configured as reference streams. Typically, capture devices of fixed devices (such as the device 506D of FIG. 5) may have wider FOVs, higher picture quality, or some other desirable property that causes them to be preferred for providing reference streams over other devices. As such, in an example, the reference selection tool 704 may select video streams received from one or more fixed devices as reference streams. That a device is a fixed device may be configured in a data store, such as the data store 604 of FIG. 6.

In another example, the reference selection tool 704 may select the video stream received from a conference participant designated as a host of the video conference as the reference stream. In another example, the reference selection tool 704 may receive an indication of a video stream that is to be used as the reference stream. In some cases, the indication may be received from one of the conference participants (e.g., a host of the video conference).

The feature detection tool 706 detects (e.g., identifies) common features in each of the video streams of the group. The feature detection tool 706 can obtain a list of identified objects in a video stream. Identifying objects in a video stream can include selecting one or images from the video stream and identifying the objects in the selected images. The feature detection tool 706 can be, use, or include a machine learning model for object detection that is trained to identify (e.g., detect or recognize) objects in images.

Common objects between two video streams can be used to stitch the two video streams together. As further described herein, different streams may be obtained from different points of view. As such, the feature detection tool 706 may determine whether two objects (or portions thereof) identified in two different streams are in fact the same object but captured from different angles. Any number of techniques can be used to determine whether two objects are a same object but captured from different angles. Such techniques include, but are not limited to, template-matching techniques that may rely on convolutional procedures, and/or feature-based techniques that may rely on extracting invariant descriptors of objects.

The FOV shift detection tool 708 determines whether the FOV of a device from which a video stream is received has changed. That the FOV of a device has changed means that the FOV of the capture device therein has changed. When the FOV changes, previously identified stitching criteria (described with respect the video stitching tool 712) for the video stream may no longer be valid and may need to be redetermined. In an example, the FOV shift detection tool 708 may receive an indication from the device that its FOV has changed. For example, the FOV shift detection tool 708 may receive a message (i.e., data) from the device essentially stating "my FOV has changed."

In another example, the FOV shift detection tool 708 may itself identify that the FOV has changed. For example, the FOV shift detection tool 708 may determine that the FOV has changed based on a comparison of images of the video stream. The FOV shift detection tool 708 may identify a baseline image of the video stream and compare subsequent images to the baseline image. Comparing a subsequent image to the baseline image can mean or include comparing respective portions of the images. The respective portions can be boundary portions. To illustrate, the boundary portions may be 20 pixels (or some other number of pixels) around the edges of the images. In another example, the image portions may be based on or include one or more objects identified in the video stream by the feature detection tool 706. That is, a subsequent image can be examined to determine whether at least one of the objects (or a portion thereof) identified in the baseline image is also identified (e.g., found) in the subsequent image and is at the same location as in the baseline image. It is noted that, as foreground portions of video stream tend to frequently change, the portions to be compared are preferably background portions.

Any number of techniques or combinations thereof can be used to compare the image portions. In an example, luminosity values can be compared. In another example, machine learning (e.g., a convolutional neural network) can be used to convert portions of respective images into features vectors. The similarity between a baseline image and another image of the video stream can be based on a comparison (e.g., a cosine distance) between the respective feature vectors of the baseline image and the other image. Based on detecting (e.g., determining) that the FOV corresponding to a video stream has changed, the FOV shift detection tool 708 sets a new baseline image that is extracted from the video stream received after the FOV change.

The image processing tool 710 may pre-process images of at least some of the video streams prior to stitching them. Objects in different video streams may have different characteristics. The image processing tool 710 may homogenize the video streams that are to be included in the unified stream. For example, the image processing tool 710 may crop, resize, scale, blend, balance colors, adjust brightness, adjust the resolution, apply some other image transformation to the video streams, or a combination thereof, to make them more similar to each other prior to stitching them. The image transformations that are applied to any one video stream may be determined based on similarities or differences between the identified common features.

To illustrate, a same object may be imaged (e.g., captured) from different points of view. As such, the image processing tool 710 may apply a warping transformation on images of a video stream so that the images can be more seamlessly stitched with another stream. In an example, the image processing tool 710 may determine that a level of warping for a video stream exceeds a warping threshold. In such a case, the image processing tool 710 may inform the stitching-image tool 714 that the video stream is not to be combined into the unified stream. As is known, warping may be performed according to a warping model. That the level of warping exceeds a warping threshold can mean that one, more than one, or a combination of some parameters of the warping model exceed a threshold or do not meet a predefined criterion.

One or more of the reference streams (selected or set by the reference selection tool 704) may be used for determining (e.g., calculating) warping models. To illustrate, a first stream may be determined to have common features with a reference stream and a second stream may be determined to have common features with the first stream. A warping model may be determined for warping the first stream with respect to a reference stream. Subsequent to warping the first stream (e.g., after warping images of the first stream) to obtain a warped first stream, a second warping model may be determined for warping the second stream with respect to the warped first stream.

The image processing tool 710 may determine which of two or more video streams a video stream is to be stitched with. The determination may be made based on a level of warping that may be required. The image processing tool 710 may select the video stream that requires the least amount of warping.

In some situations, the FOVs corresponding to two video streams may overlap such that both of them include a likeness of a conference participant. A first video stream shows a side facing view of the conference participant while a second shows a front view of the conference participant. The first video stream may be of a lower quality (e.g., lower resolution) than the second video stream. As such, the image processing tool 710 may segment images of the second video stream into respective foreground and background image segments, where the foreground segments include likenesses of the conference participant. The image processing tool 710 may replace the conference participant in the first stream with the likenesses of the conference participant obtained from the foreground segments of the second video stream. In such a situation, the second video stream is not included in the unified stream.

The video stitching tool 712 uses stitching criteria to obtain (e.g., generate) a unified stream. Based on the common features identified by the feature detection tool 706 and the processed images obtained from the image processing tool 710, stitching criteria may be determined (e.g., established or identified). A stitching criterion can be a set of rules that the video stitching tool 712 uses to stitch two video streams together. Assuming that a first video stream received from a first device is determined to be stitchable with a second video stream received from a second device, then the stitching criteria used to stitch the first video stream and the second video stream are fixed until a FOV change is detected for at least one of the first device or the second device. That the stitching criteria are fixed means that the same rules are used until a FOV change is detected.

The stitching criteria for a first video stream and a second video stream may include respective sizes and/or locations of areas of overlap for the stitching. The stitching criteria may include image processing rules that are to be performed by the image processing tool 710 and that are to be applied to a video stream prior to the stitching. To illustrate, stitching criteria may include rules that essentially state: rotate images of the first stream by 10 degrees, and stitch the right edge of images of the first stream with the left edge of images of the second stream using an overlap area of 10 pixels, where the images of the first stream are offset by 10 degrees (i.e., vertically shifted down by 10 degrees). Other stitching criteria are possible. That is, the stitching criteria may include other rules and are not limited by those used as examples herein.

In an example, the video stitching tool 712 may determine that a video stream is unstitchable into the unified stream and, as such, determine to not combine the video stream into the unified stream. For example, based on an image analysis of one or more images of the video stream, the video stitching tool 712 may determine that the video stream includes a high level of distortion. Based on the determination, the video stream is not included in the unified stream.

The unified stream may in some cases be a panoramic stream or may be a 360-degree stream. The video stitching tool 712 determines whether to obtain a panoramic stream or a 360-degree stream based on the available stitchable streams. To illustrate, in the case of cubic projection, a 360-degree stream may be formed by arranging (e.g., laying) streams onto faces of a cube and then performing cube-to-sphere projections to obtain the 360-degree stream. It is noted that other known techniques may be used to obtain the 360-degree stream.

Figure 8A:
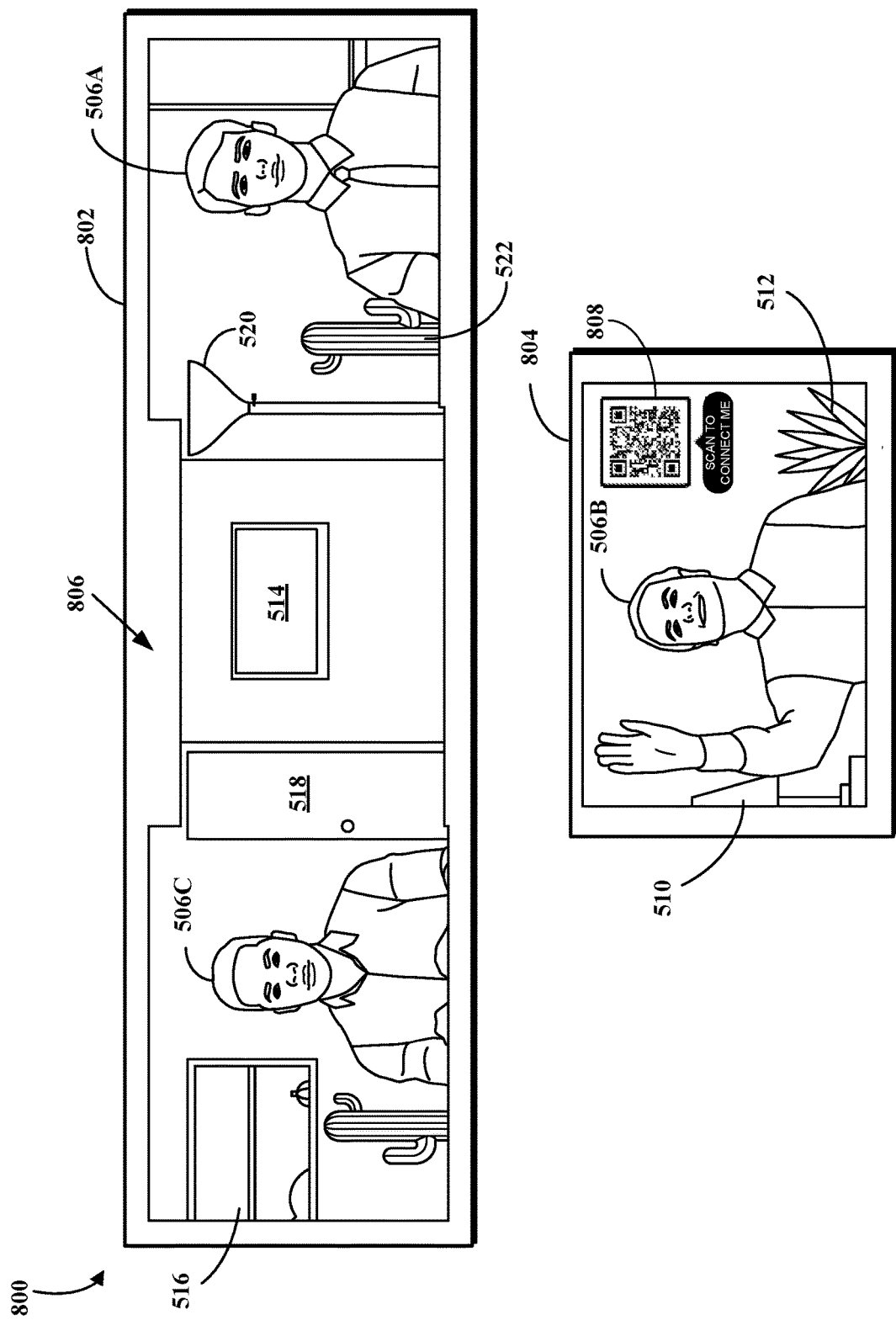
FIG. 8A illustrates an example of a user interface of a unified stream and an unstitchable stream.

FIG. 8A illustrates an example of a user interface 800 of a unified stream and an unstitchable stream. The user interface 800 includes two tiles: a tile 802 and a tile 804. The tile 802 includes a unified stream and the tile 804 includes the unstitchable stream. The user interface 800 may be displayed on a display of a conference participant. The user interface 800 may be displayed or caused to be displayed by a conferencing software that may be included in a software platform, such as the software platform 602 of FIG. 6. The unified stream of the tile 802 may be generated by a stream-unification software, such as the SUS 606 of FIG. 6.

The user interface 800 corresponds to (e.g., includes video streams corresponding to) the environment 500 of FIG. 5. For illustration purposes, at least some objects (or portions thereof) identified by the SUS are identified in FIG. 8A. As described above, the objects are used by the SUS to obtain the unified stream. Like numerals (such as the numerals identifying objects 510-522) in FIG. 5 and FIG. 8A identify the same objects. To illustrate, the object 514 is a whiteboard that is in the FOV 508D of FIG. 5; the object 520 is a lamp that is partially in the FOVs 508A and 508D; the conference participant 504C and an object 518 (portions thereof) are, respectively, a conference participant and a door that are in the FOVs 508D and 508C; and so on.

Based on the identified objects (e.g., features), the SUS stiches the video streams from the fixed device 506D, the device 506A, and the device 506C. As the SUS does not identify features common between the video stream received from the device 506B and any of the other video streams, the SUS determines that the video stream received from the device 506B is an unstitchable stream and that video stream is shown in a separate tile (i.e., the tile 804).

Reference is now again made to FIG. 7. As described above, images of a video stream may be vertically offset from another video stream in the unified video. To illustrate, the tile 802 of FIG. 8 illustrates an area 806 that does not include image data. In an example, such an area may be in-filled using adjacent portions that include image data. For example, the area 806 may be in-filled by repeating a predefined number of pixel rows or pixel columns of an adjoining (e.g., peripherally neighboring and abutting) video stream.

Figure 8B:
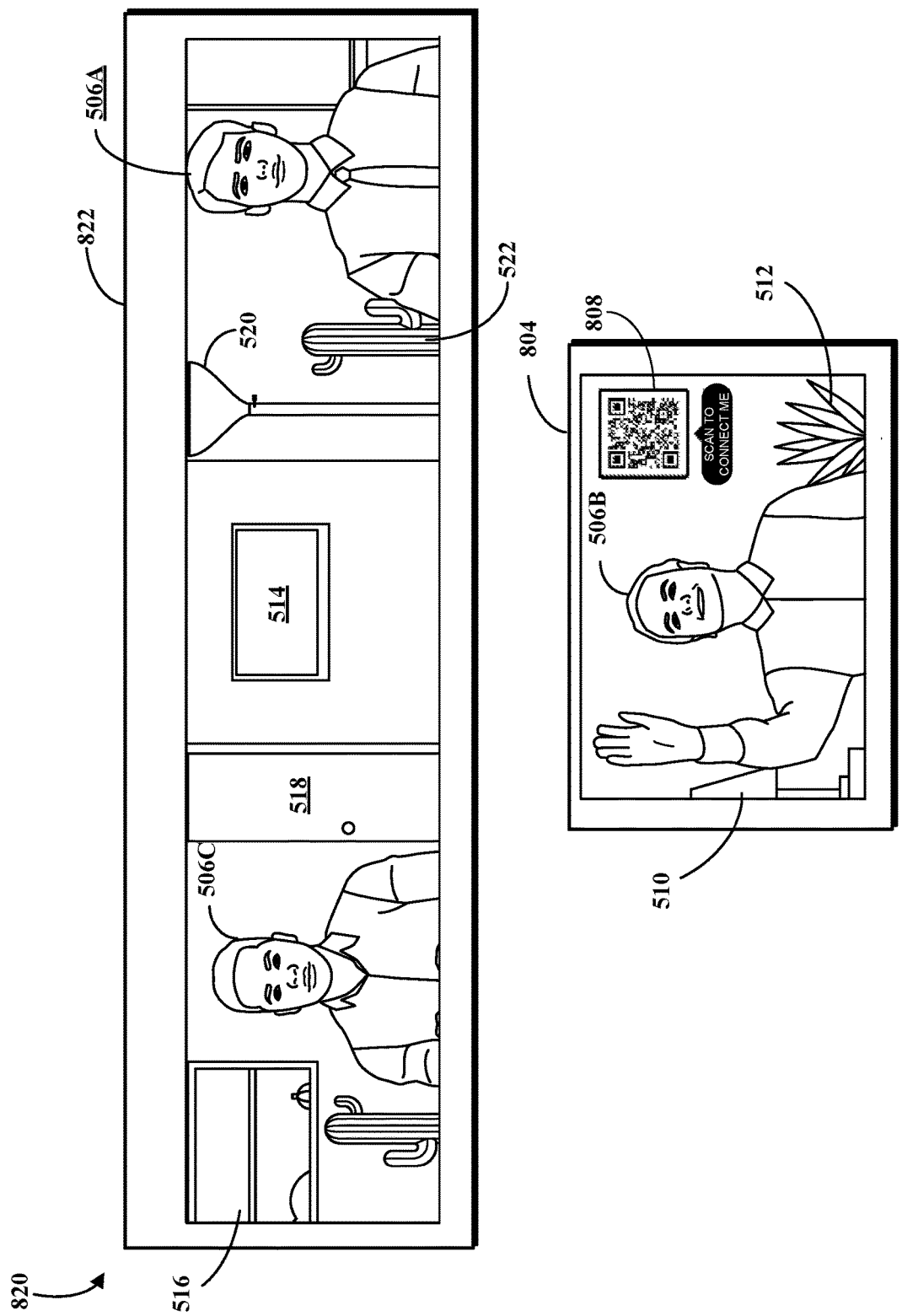
FIG. 8B illustrates an example of a user interface showing a cropped unified stream.

In an example, the video stitching tool 712 may (or may direct the image processing tool 710 to) crop a video stream based on areas of overlap with other video streams in the unified stream. In another example, the unified stream itself may be cropped such that the unified stream does not include portions that do not include image data. To illustrate, one image (e.g., stream) may be shifted 10 pixels down so that it can be stitched with another. By shifting the image down, the unified stream may include a padding area that is 10 pixels wide. The area may be padded with a certain pixel value (e.g., black or white). In an example, the portion may be padded by repeating the values of the most adjoining pixel values of the image. As such, the unified stream may be a cropped unified stream. FIG. 8B illustrates an example of a user interface 820 showing a cropped unified stream. The user interface 820 is similar to the user interface 800 with the exception that a tile 822 shows a unified stream that is cropped. That is, the unified stream does not include portions that do not include image data.

The stitching-image tool 714 obtains a stitching image (which, as mentioned, is also referred to as a bridging image). In an example, the stitching-image tool 714 may transmit a request (i.e., a stitching-image request) to at least one of the conference participants that directs the conference participant to provide the stitching image. In an example, the request is transmitted to a device associated with the conference participant whose video stream is determined to be an unstitchable stream.

The request may be transmitted to a helper device (such as the helper device 614 of FIG. 6) of the conference participant. The stitching request may essentially state "your video stream cannot be added to the unified stream. If you'd like your stream to be added to the unified stream, reply with an image that has features in common between your stream and the unified stream." The stitching-image tool 714 may receive the stitching image in response to the stitching-image request. In some situations, instead of replying with an image, the conference participant may simply adjust the FOV of the device transmitting their video stream. The FOV change may be detected by the FOV shift detection tool 708, as described above.

The stitching-image tool 714 may obtain an indication (e.g., a phone number or user ID) of the helper device from a data store, such as the data store 604 of FIG. 6. In another example, the stitching-image tool 714 may obtain the indication of the helper device from the conference participant (e.g., via the device associated with the conference participant or via a gesture directed at the camera of the device associated with the conference participant). The stitching-image tool 714 may transmit a request to the conference participant to obtain the phone number. In response to receiving the phone number, the stitching-image tool 714 may transmit a stitching-image command to the device associated with the phone number to facilitate the transmission of the stitching image by the conference participant to the stitching-image tool 714.

In an example, the stitching-image tool 714 may embed (e.g., overlay) the command onto the unstitchable stream. The command may be embedded in the form of a scan code (or the like) that can be scanned using a helper device to facilitate the transmission of the stitching image by the conference participant to the stitching-image tool 714. A command 808 of FIGS. 8A and 8B illustrates an example of such an embedded command. In an example, the command may be available only at the device transmitting that unstitchable stream (i.e., the device of the conference participant whose video stream is unstitchable). In another example, the command may be available at more devices (i.e., available to conference participants) than only the device transmitting that unstitchable stream.

Figure 9:
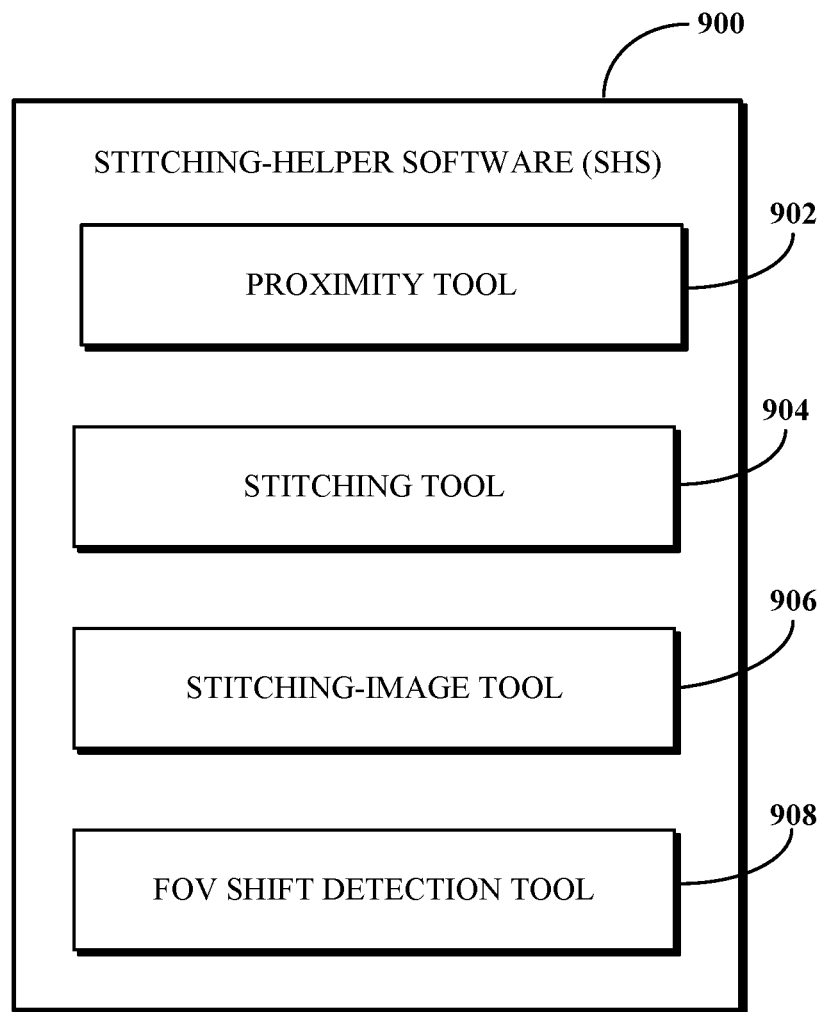
FIG. 9 is a block diagram of example functionality of a stitching-helper software.

FIG. 9 is a block diagram of example functionality of a stitching-helper software 900. The stitching-helper software 900 may be, for example, the SHS 612 or the SHS 616 of FIG. 6. The SHS 900 includes tools, such as programs, subprograms, functions, routines, subroutines, operations, executable instructions, and/or the like for, inter alia and as further described below, obtaining a stitching image used for generating a unified stream for a video conference.

At least some of the tools of the SHS 900 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the SHS 900 includes a proximity tool 902, a stitching tool 904, a stitching-image tool 906, and an FOV shift detection tool 908. In some implementations, the SHS 900 can include more or fewer tools. In some implementations, some of the tools may be combined, some of the tools may be split into more tools, or a combination thereof. In some implementations, the SHS 900 available at a user device (such as the user device 608 of FIG. 6) may include a first subset of the tools described with respect to FIG. 9. In some implementations, the SHS 900 available at a helper device (such as the helper device 614 of FIG. 6) may include a second subset (which may be different from the first subset) of the tools described with respect to FIG. 9. A device implementing the SHS 900 is referred to herein as a current device.

The proximity tool 902 transmits information that a stream-unification software, such as the SUS 606 of FIG. 6, can use to identify video streams that may be stitched into a unified stream. In an example, the proximity tool 902 transmits location information (e.g., GPS coordinates) of the current device.

In an example, the proximity tool 902 can transmit broadcast messages that receiving devices may respond to. A proximity tool of receiving devices receives the broadcast message and transmits a response back. As such, the proximity tool 902 can transmit broadcast messages and receive broadcast messages. The current device transmits the list of devices from which responses were received to the SUS.

A response to a broadcast message from a device can include an identifier of the receiving device. An identifier can be used by the SUS to uniquely identify a video stream transmitted from that device. In an example, the broadcast message includes a unique conference identifier corresponding to the video conference that the current device is joined to. Devices that are joined to the same video conference (based on the unique conference identifier) transmit responses to the current device.

The broadcast messages can be transmitted using Infrared, Near-Field Communication (NFC), Li-Fi, low-power frequency modulation (FM), amplitude modulation (AM), or Single Side Band (SSB) radio signals, or similar protocols. In an example, the broadcast messages can be Bluetooth Low Energy (BLE) beacon packets. In BLE parlance, when the current device is transmitting broadcast messages, it may be referred to as a "broadcaster" and may transmit the broadcast messages during "advertising intervals." Relatedly, when the current device 500 is receiving the broadcast messages from other devices, it may be referred to as an "observer."

The stitching tool 904 can stitch images at the current device to obtain a locally-stitched stream. The locally-stitched stream can then be transmitted to the SUS. To illustrate, the current device may include two or more cameras. As such, two or more video streams may be obtained at the current device. Instead of separately transmitting the two or more video streams, the stitching tool 904 may stitch (such as based on commonly identified features) at least some of the two or more video streams prior to transmission to the SUS. In an example, the SHS 900 may receive an instruction (e.g., directive, request, or command) from the SUS to perform the stitching locally (i.e., at the current device). If such an instruction is not received from the SUS, then the current device may transmit the two or more video streams without stitching at least some of them together.

In an example, the stitching tool 904 may stitch a video stream with a stitching (e.g., bridging) image. In an example, the stitching image may be obtained from the SUS. That is, the SUS may transmit the stitching image to the SHS 900 with an instruction to locally stitch a the stitching image into the video stream prior to transmitting the video stream to the SUS. In another example, the stitching image may be obtained from a helper device. More specifically, the stitching image may be obtained from a stitching image tool that may be implemented by the helper device. Obtaining the stitching image can be as illustrated with respect to FIG. 10A, as described below.

In an example, the stitching image may be obtained at the current device using the stitching-image tool 906. For example, a command (i.e., a stitching image obtaining command) may be provided by the SHS 900 that, when invoked by a conference participant associated with the current device, facilitates the obtaining of the stitching image at the current device. To illustrate, when the command is invoked, the SHS 900 may be placed in a mode such that a video stream obtained at the current device is temporarily not transmitted to the SUS. The conference participant may be able to change the FOV of the camera of the current device to capture (e.g., snap) an image that can be used as a stitching image. In an example, the stitching-image tool 906 may transfer the stitching image to the SUS. In an example, the stitching-image tool 906 may locally stitch the stitching image. Subsequent to obtaining the stitching image, the current device resumes transmission of a video stream to the SUS. To summarize, the current device may be in video streaming mode; in response to a stitching image obtaining a command, the current device is placed in a stitching-image capture mode; in response to the command being completed (e.g., performed or cancelled), the current device is returned to the video streaming mode to resume transmitting a video stream to the conferencing software.

The FOV shift detection tool 908 detects changes in FOV of a capture device of the current device. The FOV shift detection tool 908 transmits an indication of the FOV change to the SUS. In an example, the indication of the FOV change may be a flag indicating that the FOV change has occurred. As described above, in response to receiving the FOV change information with respect to a video stream, the SUS may re-identify stitching criteria for stitching the video stream into a unified video.

In an example, the FOV shift detection tool 908 may use sensors of the current device to identify the FOV change. For example, data from a gyroscope or some other motion sensor of the current device may be used to detect (e.g., infer) the FOV change. In an example, image analysis techniques can be used to detect the FOV change. For example, the FOV shift detection tool 908 may obtain a baseline image of the video stream and identify one more portions or objects within the baseline image. The FOV shift detection tool 908 can compare subsequent images of the video stream to the baseline image. Comparing a subsequent image to the baseline image can include comparing the identified one more portions or objects of the baseline image to co-located portions of the subsequent image. The comparison can generate a confidence score related to an inference that the FOV has changed. If the confidence score is greater than a threshold, then the FOV is inferred to have changed. A confidence score (rather than a binary score) is obtained so that the comparison can be tolerant to objects moving in the background of the video stream, objects being obscured, and the like.

Figure 10A:
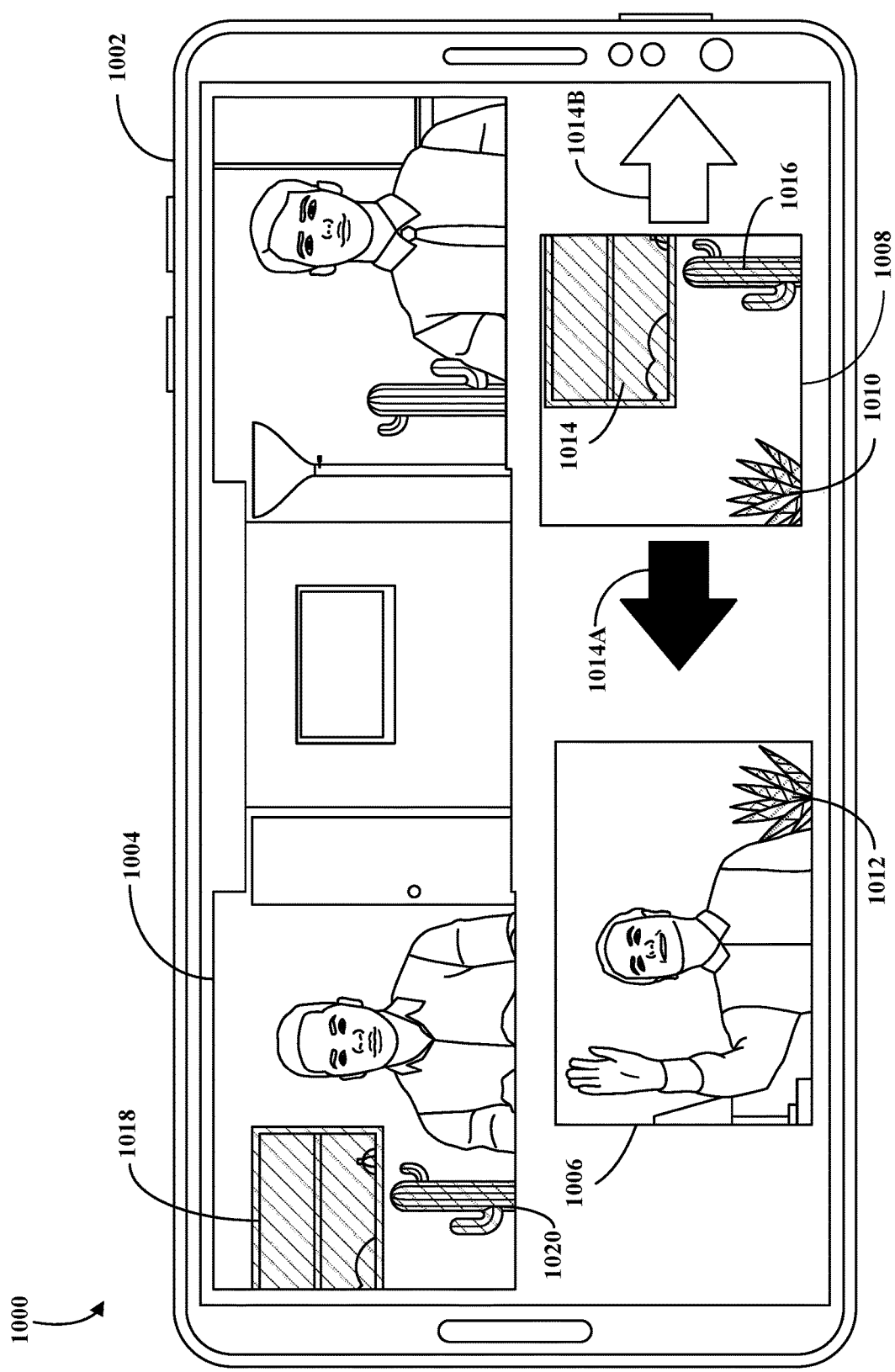
FIG. 10A illustrates an example of obtaining a stitching image using a helper device.

FIG. 10A illustrates an example 1000 of obtaining a stitching image using a helper device 1002. The example 1000 illustrates a stitching-image tool that is executing at the helper device 1002, which in this example is a mobile phone. The stitching-image tool may be executed (e.g., launched) in response to executing (e.g., invoking or launching) a command that facilitates the obtaining of the stitching image. In an example, the stitching-image tool may be executed in response to scanning a command 808 of FIG. 8A or 8B.

When launched, the stitching-image tool displays first visual data 1004 and second visual data 1006. The first visual data 1004 corresponds to the unified stream shown in the tile 802 of FIG. 8, and the second visual data 1006 corresponds to the unstitchable stream shown in the tile 804 of FIG. 8. In an example, the first visual data 1004 may be one image of the unified stream, and the second visual data 1006 may be one image of the unstitchable stream. In an example, the first visual data 1004 and the second visual data 1006 can be, respectively, the unified stream and the unstitchable stream themselves.

An operator (e.g., a conference participant) of the helper device 1002 may hold the helper device and pan the camera of the helper device across the environment. A window 1008 displays a preview of the FOV of the camera. Images displayed in the window 1008 are referred to herein as preview images. Arrows 1014A and 1014B indicate a direction of the pan. The arrow 1014A, being filled, indicates that the helper device is being panned in the direction of the arrow 1014A. The window 1008 illustrates that a portion 524 of the conference room 502 of FIG. 5 is currently in the FOV.

As the helper device 1002 is being panned, the stitching-image tool highlights identified common features. For example, an object 1010 in the stitching image and an object 1012 in the second visual data 1006, which correspond to an object 512 of FIG. 5, are highlighted using a same pattern indicating that the matched objects can be used for stitching; and objects 1014-1016 in the stitching image and corresponding objects 1018-1020 in the second visual data 1006, which correspond to objects 516 and 526, respectively, of FIG. 5, are highlighted using a same pattern indicating that the matched objects can be used for stitching. In an example, in response to identifying the matching objects, the stitching-image tool can capture the image previewed in the window 1008 and transmit the image, such as to the SUS. In another example, the operator of the helper device 1002 may capture the image for transmission to the SUS.

Figure 10B:
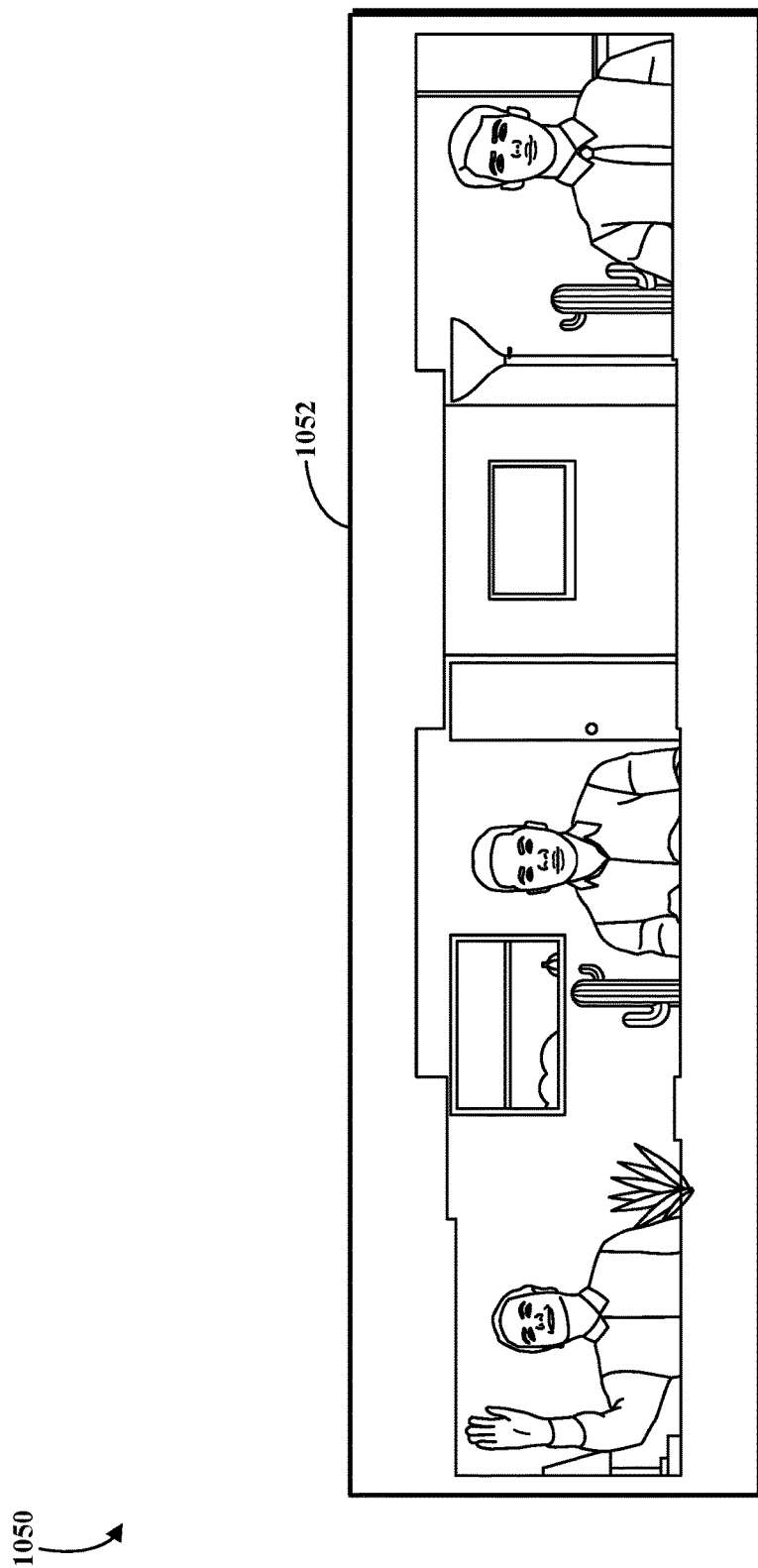
FIG. 10B illustrates an example of a user interface of a unified stream.

FIG. 10B illustrates an example of a user interface 1050 of a unified stream. As contrasted with the user interface 800 of FIG. 8A, the user interface 1050 includes only one tile (i.e., a tile 1052) showing a unified stream that combines the unified stream shown in the tile 802 of FIG. 8A, the unstitchable stream of the tile 804 of FIG. 8A, and the stitching image shown in the window 1008 of FIG. 10A.

Figure 11:
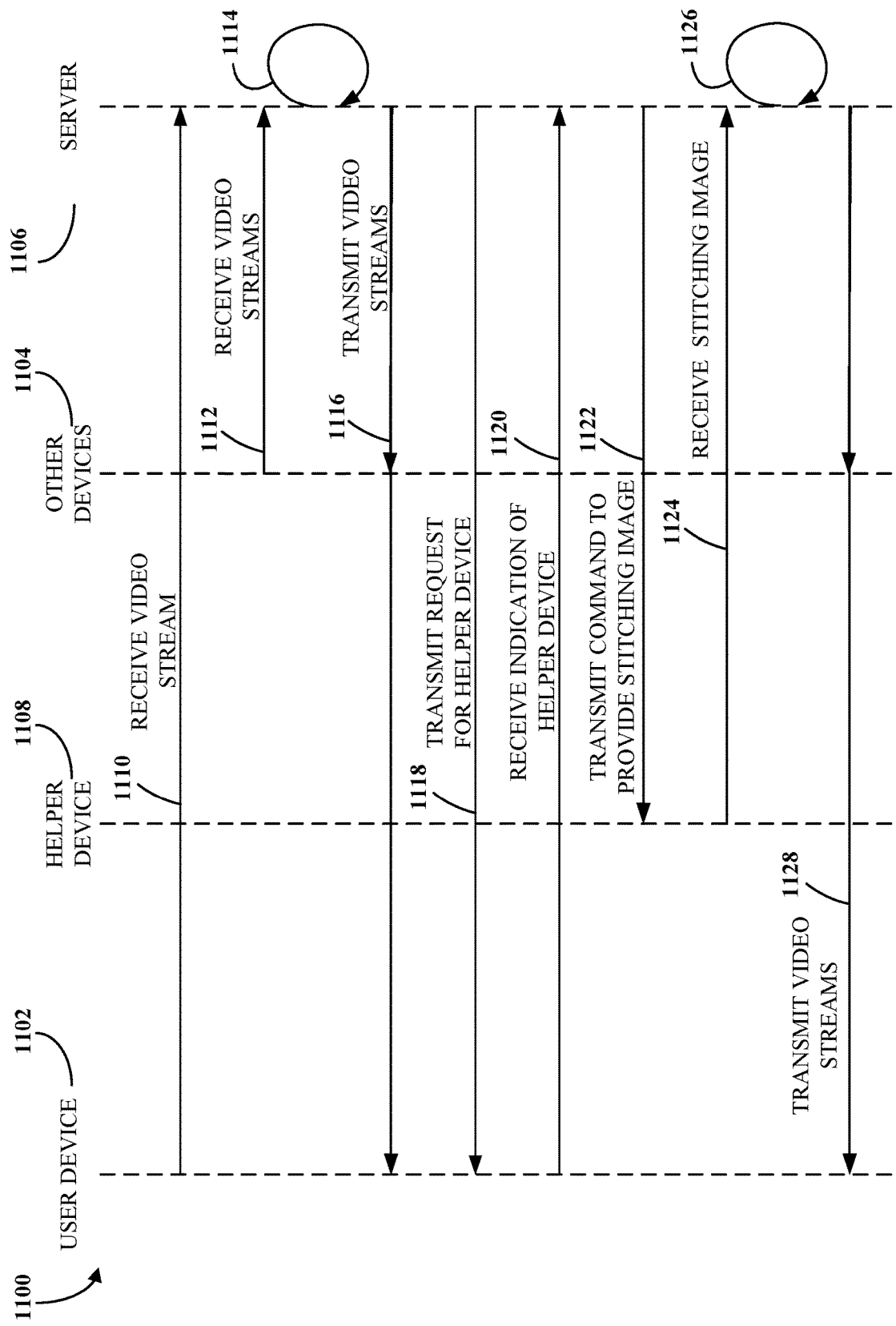
FIG. 11 is an example of an interaction diagram for obtaining a stitching image.

FIG. 11 is an example of an interaction diagram 1100 for obtaining a stitching image. The interaction diagram 1100 illustrates that a user device 1102 and other devices 1104 (i.e., one or more other devices) are joined to a video conference (not shown) that is hosted by a server 1106. The user device 1102 and the other devices 1104 are determined to be within a same location. That is, the server (i.e., a conferencing software therein) grouped the user device 1102 and the other devices 1104 for the purposes of obtaining a unified video stream. The user device 1102 can be as described with respect to the user device 608 of FIG. 6. A helper device 1108 may be a personal device (e.g., a mobile phone) associated with the conference participant using the user device 1102.

At 1110, the server receives a video stream from the user device 1102. At 1112, the server receives one or more video streams from the other devices 1104. The server 1106 combines at least some of the received video streams into a unified video stream. The interaction diagram 1100 is intended to illustrate the case where the video stream from the user device 1102 is an unstitchable stream. As such, at 1114, the server 1106 determines that the video stream from the user device 1102 is an unstitchable stream. At 1116, the server 1106 transmits video streams for display at devices of at least some of the user device 1102 and the other devices 1104. The video streams transmitted at 1114 include at least one unified stream and at least one unstitchable stream (i.e., the video stream received from the user device 1102).

At 1118, in response to determining that the video stream from the user device 1102 is unstitchable, the server 1106 transmits a request to the user device 1102 for a helper device. The conference participant associated with the user device 1102 may respond to the request with a phone number of the helper device 1108. As such, at 1120, the server 1106 receives the indication of the helper device 1108. At 1122, the server 1106 transmits a stitching-image command that, when invoked (e.g., used) at the helper device 1108, facilitates the obtaining of a stitching image. At 11A24, the stitching image is received at the server 1106 from the helper device 1108. While not specifically shown in FIG. 11, the server may be continuously receiving video streams at described with respect to 1110-1112. At 1126, the server 1106 uses the stitching image as bridging image for stitching the video stream from the user device 1102 into the unified video. At 1128, the server 1106 transmits the unified stream to at least some of the user device 1102 and the other devices 1104.

In an example, a fixed device, such as the fixed device 506D of FIG. 5, may be used to obtain the stitching image. The fixed device may provide pan-tilt-zoom (PTZ) capabilities. As such, when the fixed device connects to a conference (or at any time during the conference), the fixed device may be directed (such as by a SUS or a conference participant) to scan and obtain images of the environment. The images are then received at the SUS. In response to identifying an unstitchable stream, the SUS can identify a stitching image in the received images. In another example, previously obtained images (e.g., images obtained before a current conference that the fixed device is connected to) can also be used to identify a stitching image.

Figure 12:
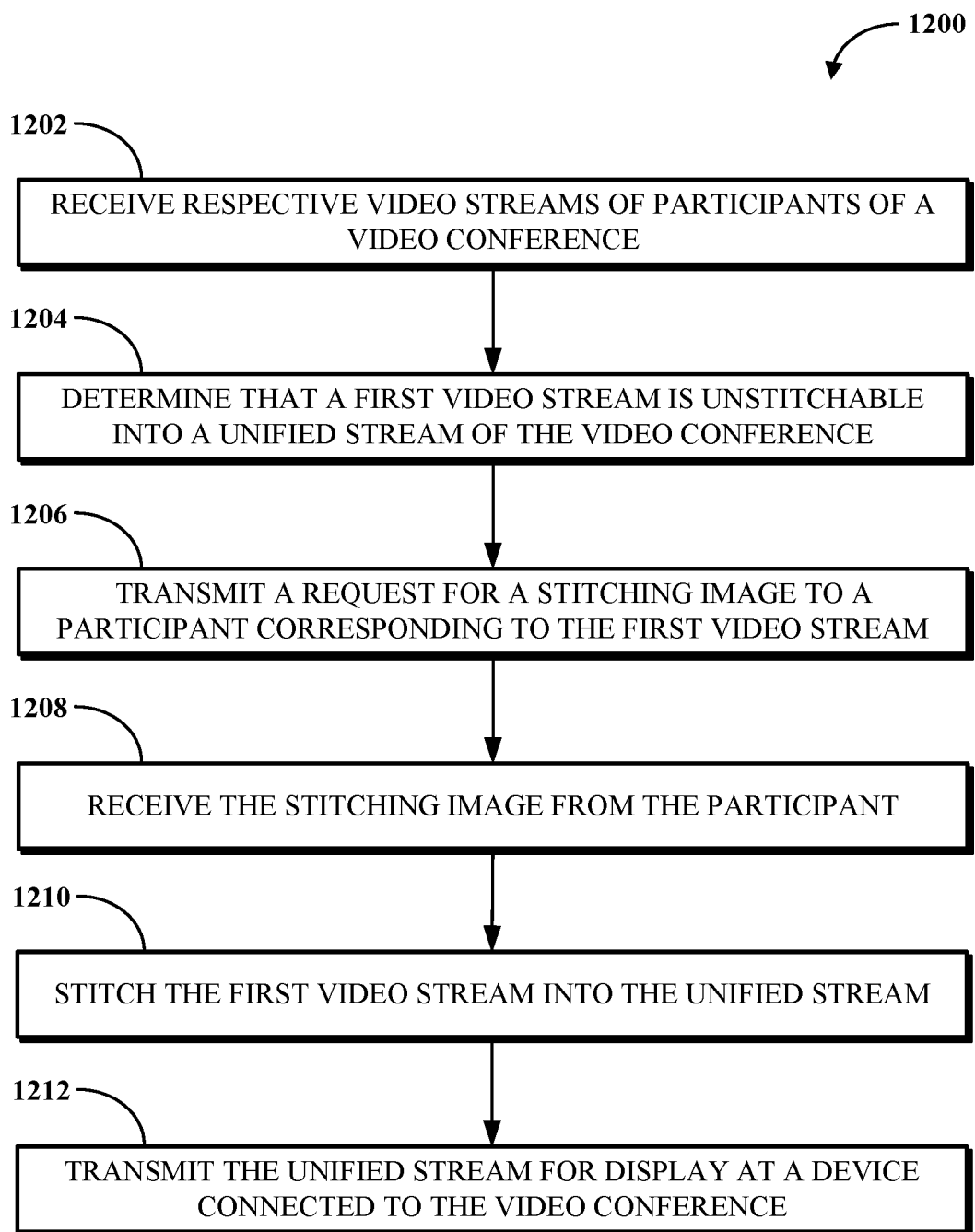
FIG. 12 is a flowchart of an example of a technique for obtaining a stitching image usable for combining an unstitchable video stream into a unified video stream of a video conference.

To further describe some implementations in greater detail, reference is next made to examples of techniques which may be performed for generating a unified stream for a video conference and/or obtaining a stitching image that can be used in generating the unified stream. FIG. 12 is a flowchart of an example of a technique 1200 for obtaining a stitching image usable for combining an unstitchable video stream into a unified video stream of a video conference. The technique 1200 can be executed using computing devices, such as the systems, hardware, and software described with respect to FIGS. 1-11. The technique 1200 can be performed, for example, by executing a machine-readable program or other computer-executable instructions, such as routines, instructions, programs, or other code. The steps, or operations, of the technique 1200 or another technique, method, process, or algorithm described in connection with the implementations disclosed herein can be implemented directly in hardware, firmware, software executed by hardware, circuitry, or a combination thereof.

For simplicity of explanation, the technique 1200 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1202, respective video streams of participants of a video conference are received. More specifically, the respective video streams are received from devices associated with the participants. At 1204, the technique 1200 determines that a first video stream of the respective video streams is unstitchable into a unified stream of the video conference. In an example, and as described above, the video stream may be unstitchable because no common features were identified between the video stream and another video stream that is part of the unified stream.

At 1206, and in response to determining that the video stream is unstitchable, a request for a stitching image is transmitted to a participant of the participants corresponding to the first video stream. Broadly, the request can be or include a series of interactions that results in the receiving a stitching image. In an example, the request includes obtaining an indication of a helper device, as described above. A stitching-image command is then transmitted to the helper device. In an example, the request may be in the form of a command that may be embedded in the unstitchable video stream. In any case, regardless of the form of the request, the technique 1200 receives the stitching image at 1208. In an example, the stitching image is received from the conference participant associated with the unstitchable stream. In another example, the stitching image is received from another conference participant.

At 1210, the video stream is stitched into the unified stream by stitching the video stream with at least one other video stream of the respective video streams using the stitching image. As described above, stitching the image into the unified stream includes identifying common features between, on the one hand, the stitching image and the video stream and, on the other hand, the stitching image and at least one of the video streams included in the unified stream. At 1212, the unified stream is transmitted for display at a device connected (e.g., joined) to the video conference.

In an example, the technique 1200 can include, responsive to determining that a first identified stitching criterion between a second video stream and a third video stream of the respective video streams is no longer maintained, identifying a second stitching criterion for the second video stream. That the stitching criterion is no longer maintained can be determined based on a changed FOV. As such, responsive to determining that a FOV corresponding to the second video stream is changed, identifying the second stitching criterion for stitching the second video stream with the third video stream. The second video stream and the third video stream are then stitched using the second stitching criterion. In an example, that a FOV has changed can be determined, using (e.g., by comparing at least portions of) a first image and second image of the second video stream.

In an example, a device associated with one of the respective video streams is not stationary may be determined to be moving (e.g., not stationary). That a device is determined not be stationary, can be determined based on sensor data obtained at the device. Responsive to determining that the device associated with the one of the respective video streams is not stationary, the technique 1200 omits stitching the one of the respective video streams into the stitched stream. If the one of the respective video streams was already stitched into the unified stream, then the technique 1200 can discontinue stitching the one of the respective video streams into the unified stream.

In an example, a foreground image segment is extracted from an image of a second video stream of the respective video streams. The foreground can be added to an image of a third video stream of the respective video streams. The third video stream can be stitched into the stitched stream. The second video stream is not stitched into the stitched stream. That is, the technique 1200 omits stitching the second video stream into the stitched stream.

Figure 13:
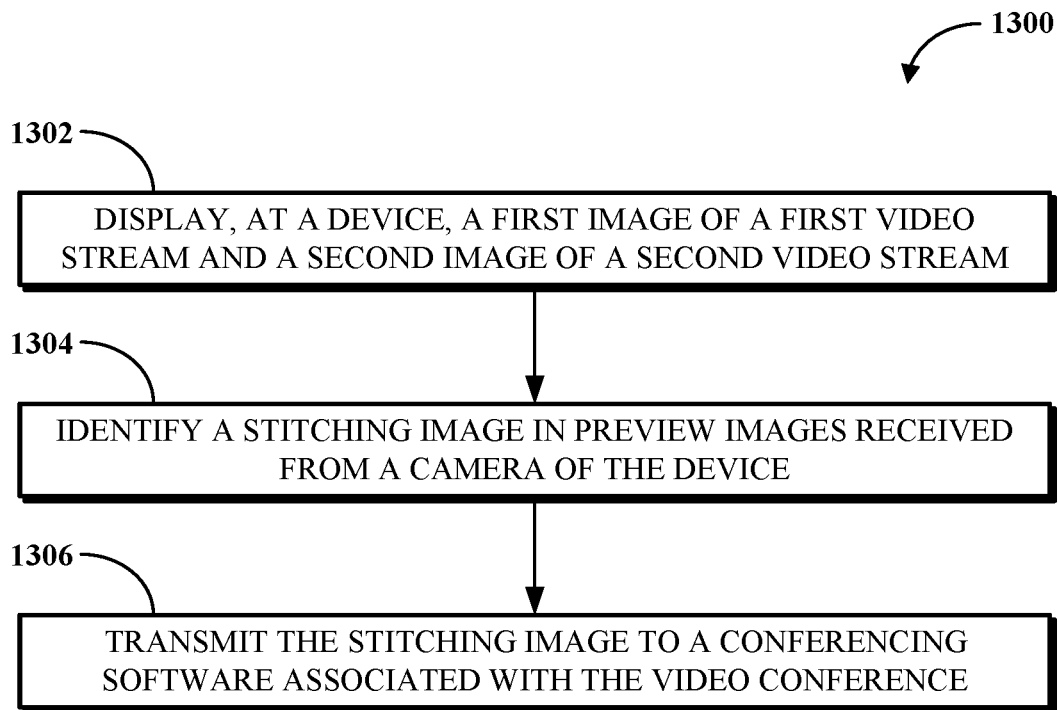
FIG. 13 is a flowchart of an example of a technique for obtaining a stitching image usable for combining an unstitchable video stream into a unified video stream of a video conference.

FIG. 13 is a flowchart of an example of a technique 1300 for obtaining a stitching image usable for combining an unstitchable video stream into a unified video stream of a video conference. The technique 1300 can be executed using computing devices, such as the systems, hardware, and software described with respect to FIGS. 1-11. The technique 1300 can be executed at a helper device, such as the helper device 614 of FIG. 6. The techniques 1300 can be executed at a user device, such as the user device 608 of FIG. 6. The technique 1300 can be implemented by a stitching-helper software, such as the SHS 612, the SHS 616 of FIG. 6, or the SHS 900 of FIG. 9. The technique 1300 can be performed, for example, by executing a machine-readable program or other computer-executable instructions, such as routines, instructions, programs, or other code. The steps, or operations, of the technique 1300 or another technique, method, process, or algorithm described in connection with the implementations disclosed herein can be implemented directly in hardware, firmware, software executed by hardware, circuitry, or a combination thereof.

For simplicity of explanation, the technique 1300 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1302, a first image of a first video stream and a second image of a second video stream are displayed at the device. The first video stream and the second video stream can be video streams of a video conference. In an example, the first image and the second image can be displayed as described with respect to FIG. 10A. At 1304, a stitching image is identified (e.g., selected) in preview images received from a camera of the device. The preview image can be displayed in a window such as the window 1008 of FIG. 10A. The stitching image can be identified responsive to identifying a first common feature between the first image and a preview image of the preview images and identifying a second common feature between a second image and the preview image. In an example, an operator of the device may identify the stitching image. That is, in response to the operator performing an action indicating that a preview image is to be selected as the stitching image, the technique 1300 selects the preview image as the stitching image. In another example, the technique 1300 automatically identifies the stitching image when the common features are identified. At 1306, the stitching image is transmitted to a conferencing software associated with the video conference.

In an example, a first common feature is identified in a first image and in the stitching image. The first common feature can be highlighted in the first image and the stitching image. A second common feature is identified in the stitching image and a second image. The second common feature can be highlighted in the second image and the stitching image. In an example, a command to enable the camera is associated with the first video stream. For example, the command (e.g., a scan code) can be embedded in images of the first video stream. In an example, a unified video stream that includes the first video stream, the second video stream, and the stitching image is received, such as from a stream-unification software, for display at the device. The unified video stream is received after the stream-unification software performs the stitching, as described herein. As such, the received unified video stream can be as described with respect to FIG. 10B.

In an example, a change to a field of view corresponding to the first video stream is determined (e.g., identified or detected). An indication of the change of the field of view to the conferencing software can be transmitted to the stream-unification software. In an example, the stitching image can be stitched with the first video stream at the device to obtain a locally stitched video stream. The locally stitched video stream can be transmitted to the conferencing software While this disclosure is described with respect to stitching images, video streams, and unified streams corresponding to physical environments, the disclosure is not so limited. The stitching images, video streams, and/or unified streams may be those of a virtual space, an augmented reality space, or a space that may be referred to as a metaverse or a cyberspace (collectively virtual spaces). In an example, whether the stitching images and video streams correspond to physical environments, virtual environments, or a combination thereof, a SUS may generate the unified stream as a stream of a virtual environment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method can include receiving respective video streams of participants of a video conference. The method also includes determining that a first video stream of the respective video streams is unstitchable into a unified stream of the video conference. The method can include transmitting a request for a stitching image to a participant of the participants corresponding to the first video stream. The method can include receiving the stitching image from the participant. The method can include stitching the first video stream into the unified stream by stitching the first video stream with at least one other video stream of the respective video streams using the stitching image. The method can include transmitting the unified stream for display at a device connected to the video conference. Other embodiments of this aspect include corresponding computer systems, apparatus, and computer programs recorded on one or more computer storage devices, each configured to perform the actions of the methods.

Implementations may include one or more of the following features. The method may include identifying a first stitching criterion between a second video stream and a third video stream of the respective video streams for stitching the second video stream with the third video stream; responsive to determining that a field of view corresponding to the second video stream is changed, identifying a second stitching criterion for stitching the second video stream with the third video stream; and stitching the second video stream and the third video stream using the second stitching criterion. The method may include, responsive to determining that a first identified stitching criterion between a second video stream and a third video stream of the respective video streams is no longer maintained, identifying a second stitching criterion for the second video stream.

The method may include identifying a stitching criterion between a second video stream and a third video stream of the respective video streams; determining, using a first image and second image of the second video stream, that the stitching criterion is not maintained; and responsive to determining that the stitching criterion is not maintained, identifying a new stitching criterion for the second video stream.

The method may include determining that a device associated with one of the respective video streams is not stationary; and responsive to determining that the device associated with the one of the respective video streams is not stationary, discontinuing stitching the one of the respective video streams into the unified stream.

The method may include identifying one of the respective video streams as a reference for obtaining the unified stream; and using the one of the respective video streams as an initial stream of the unified stream.

The method may include extracting a foreground image segment from an image of a second video stream of the respective video streams; adding the foreground image segment to an image of a third video stream of the respective video streams; and stitching the third video stream into the unified stream. A second video stream of the respective video streams is a stitched video stream that is stitched at a device from which the second video stream is transmitted. The method can include embedding a command in the first video stream. The command facilitates obtaining the stitching image at a helper device. The unified stream can includes a second video stream and the method can include performing an image processing operation on images of the second video stream prior to including the second video stream into the unified stream. Implementations of the described techniques may include hardware, a method or process, or computer software on a computer-accessible medium.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
receiving respective video streams of participants of a video conference, wherein the respective video streams consist of a first video stream and other video streams;
determining, based on an absence of identifiable common features between the first video stream and the other video streams, that the first video stream of the respective video streams is unstitchable into a unified stream of the video conference;
transmitting a request for a stitching image to a participant of the participants corresponding to the first video stream;
receiving the stitching image from the participant, wherein the stitching image is required to include at least one feature in common with the first video stream and at least one of the other video streams;
stitching the first video stream into the unified stream by stitching the first video stream with at least one other video stream of the respective video streams using the stitching image; and
transmitting the unified stream for display at a device connected to the video conference.

2. The method of claim 1, further comprising:
identifying a first stitching criterion between a second video stream and a third video stream of the respective video streams for stitching the second video stream with the third video stream;
responsive to determining that a field of view corresponding to the second video stream is changed, identifying a second stitching criterion for stitching the second video stream with the third video stream; and
stitching the second video stream and the third video stream using the second stitching criterion.

3. The method of claim 1, further comprising:
responsive to determining that a first identified stitching criterion between a second video stream and a third video stream of the respective video streams is no longer maintained, identifying a second stitching criterion for the second video stream.

4. The method of claim 1, further comprising:
identifying a stitching criterion between a second video stream and a third video stream of the respective video streams;
determining, using a first image and second image of the second video stream, that the stitching criterion is not maintained; and
responsive to determining that the stitching criterion is not maintained, identifying a new stitching criterion for the second video stream.

5. The method of claim 1, further comprising:
determining that a device associated with one of the respective video streams is not stationary; and
responsive to determining that the device associated with the one of the respective video streams is not stationary, discontinuing stitching the one of the respective video streams into the unified stream.

6. The method of claim 1, further comprising:
identifying one of the respective video streams as a reference for obtaining the unified stream; and
using the one of the respective video streams as an initial stream of the unified stream.

7. The method of claim 1, further comprising:
extracting a foreground image segment from an image of a second video stream of the respective video streams;
adding the foreground image segment to an image of a third video stream of the respective video streams; and
stitching the third video stream into the unified stream.

8. The method of claim 1, wherein a second video stream of the respective video streams is a stitched video stream that is stitched at a device from which the second video stream is transmitted.

9. The method of claim 1, further comprising:
embedding a command in the first video stream, wherein the command facilitates obtaining the stitching image at a helper device.

10. A device, comprising:
a memory; and
a processor, the processor configured to execute instructions stored in the memory to:
receive respective video streams of participants of a video conference, wherein the respective video streams consist of a first video stream and other video streams;
determine, based on an absence of identifiable common features between the first video stream and the other video streams, that the first video stream of the respective video streams is unstitchable into a unified stream of the video conference;
transmit a request for a stitching image to a participant of the participants corresponding to the first video stream;
receive the stitching image from the participant, wherein the stitching image is required to include at least one feature in common with the first video stream and at least one of the other video streams;
stitch the first video stream into the unified stream by stitching the first video stream with at least one other video stream of the respective video streams using the stitching image; and
transmit the unified stream for display at a device connected to the video conference.

11. The device of claim 10, wherein the processor is further configured to execute instructions stored in the memory to:
identify a first stitching criterion between a second video stream and a third video stream of the respective video streams for stitching the second video stream with the third video stream;
responsive to determining that a field of view corresponding to the second video stream is changed, identify a second stitching criterion for stitching the second video stream with the third video stream; and
stitch the second video stream and the third video stream using the second stitching criterion.

12. The device of claim 10, wherein the processor is further configured to execute instructions stored in the memory to:
responsive to determining that a first identified stitching criterion between a second video stream and a third video stream of the respective video streams is no longer maintained, identify a second stitching criterion for the second video stream.

13. The device of claim 10, wherein the processor is further configured to execute instructions stored in the memory to:
identify a stitching criterion between a second video stream and a third video stream of the respective video streams;
determine, using a first image and second image of the second video stream, that the stitching criterion is not maintained; and
responsive to determining that the stitching criterion is not maintained, identify a new stitching criterion for the second video stream.

14. The device of claim 10, wherein the processor is further configured to execute instructions stored in the memory to:
determine that a device associated with one of the respective video streams is not stationary; and
responsive to determining that the device associated with the one of the respective video streams is not stationary, omit stitching the one of the respective video streams into the unified stream.

15. The device of claim 10, wherein a second video stream of the respective video streams is a stitched video stream that is stitched at a device from which the second video stream is transmitted.

16. The device of claim 10, wherein the processor is further configured to execute instructions stored in the memory to:
embed a command in the first video stream, wherein the command facilitates obtaining the stitching image at a helper device.

17. A non-transitory computer-readable storage medium storing instructions operable to cause one or more processors to perform operations comprising, comprising:
receiving respective video streams of participants of a video conference, wherein the respective video streams consist of a first video stream and other video streams;
determining, based on an absence of identifiable common features between the first video stream and the other video streams, that the first video stream of the respective video streams is unstitchable into a unified stream of the video conference;
transmitting a request for a stitching image to a participant of the participants corresponding to the first video stream;
receiving the stitching image from the participant, wherein the stitching image is required to include at least one feature in common with the first video stream and at least one of the other video streams;
stitching the first video stream into the unified stream by stitching the first video stream with at least one other video stream of the respective video streams using the stitching image; and
transmitting the unified stream for display at a device connected to the video conference.

18. The non-transitory computer-readable storage medium of claim 17, wherein a second video stream of the respective video streams is a stitched video stream that is stitched at a device from which the second video stream is transmitted.

19. The non-transitory computer-readable storage medium of claim 17, wherein the operations further comprise:

embedding a command in the first video stream, wherein the command facilitates obtaining the stitching image at a helper device.

20. The non-transitory computer-readable storage medium of claim 17, wherein the unified stream includes a second video stream, and wherein the operations further comprise:

performing an image processing operation on images of the second video stream prior to including the second video stream into the unified stream.

* * * * *